(12) United States Patent
Hickman

(10) Patent No.: US 12,292,304 B2
(45) Date of Patent: May 6, 2025

(54) SYSTEM AND METHOD FOR DETERMINING PASSING, NO-PASSING ZONES ON ROADWAYS

(71) Applicant: Nicholas Hickman, Delaware, OH (US)

(72) Inventor: Nicholas Hickman, Delaware, OH (US)

(*) Notice: Subject to any disclaimer, the term of this patent is extended or adjusted under 35 U.S.C. 154(b) by 240 days.

(21) Appl. No.: 18/085,368

(22) Filed: Dec. 20, 2022

(65) Prior Publication Data
US 2023/0196912 A1    Jun. 22, 2023

Related U.S. Application Data

(60) Provisional application No. 63/291,713, filed on Dec. 20, 2021.

(51) Int. Cl.
| | |
|---|---|
| G01C 21/00 | (2006.01) |
| G01C 15/00 | (2006.01) |
| G06V 20/56 | (2022.01) |
| G08G 1/01 | (2006.01) |
| G08G 1/04 | (2006.01) |
| H04N 23/698 | (2023.01) |
| G06V 20/58 | (2022.01) |

(52) U.S. Cl.
CPC ......... *G01C 21/3822* (2020.08); *G01C 15/00* (2013.01); *G01C 15/002* (2013.01); *G01C 21/3848* (2020.08); *G06V 20/56* (2022.01); *G08G 1/0112* (2013.01); *G08G 1/0133* (2013.01); *G08G 1/04* (2013.01); *H04N 23/698* (2023.01); *G06V 20/58* (2022.01)

(58) Field of Classification Search
CPC .. G01C 21/3822; G01C 15/00; G01C 15/002; G01C 21/3848; G06V 20/56; G06V 20/58; G08G 1/0112; G08G 1/0133; G08G 1/04; H04N 23/698; H04N 23/60
USPC .......................................................... 701/408
See application file for complete search history.

(56) References Cited

U.S. PATENT DOCUMENTS

| | | | |
|---|---|---|---|
| 2016/0148513 A1* | 5/2016 | Beaurepaire | G08G 1/164 701/117 |
| 2018/0373260 A1* | 12/2018 | Lipson | G01S 17/10 |
| 2019/0041522 A1* | 2/2019 | Slutsky | G01S 17/89 |
| 2024/0111058 A1* | 4/2024 | Tapia | G01S 17/931 |

FOREIGN PATENT DOCUMENTS

| | | | |
|---|---|---|---|
| JP | 3393166 B2 | * | 4/2003 |
| JP | 2006029822 A | * | 2/2006 |
| WO | WO-2005022084 | * | 3/2005 |

* cited by examiner

*Primary Examiner* — Muhammad Shafi
(74) *Attorney, Agent, or Firm* — Standley Law Group LLP; Jeffrey S. Standley; Kenny W. Pung

(57) ABSTRACT

Systems and methods for determining passing and no-passing zones on a roadway. The systems utilize sensors such as an inertial measurement unit, a distance measuring indicator, and a GNSS unit to track the position and orientation of a vehicle as it travels along a route. The systems also utilize a 360° camera and a lidar sensor to generate 360° footage and a lidar map, respectively, of the route. The methods utilize the data and images generated by the system to make line-of-sight determinations for various locations along the route. These determinations are then utilized to determine where passing and no-passing zones should be on a roadway.

10 Claims, 18 Drawing Sheets

SYSTEM AND METHOD FOR DETERMINING PASSING, NO-PASSING ZONES ON ROADWAYS

CROSS-REFERENCE TO RELATED APPLICATIONS

This application is a nonprovisional patent application that makes a priority claim to U.S. App. Ser. No. 63/291,713, filed Dec. 20, 2021, the disclosure which is hereby incorporated by reference in its entirety as if fully recited herein.

FIELD

The application relates to conducting passing zone studies and, more particularly, to a system and method to determine passing, no-passing zones for roadways utilizing mobile mapping data.

BACKGROUND

Present day passing zone studies are usually carried out by two vehicles driving in tandem at a pre-calculated distance deemed safe for passing. The trailing car represents the passing car, and the lead car represents oncoming traffic. The cars travel along the entire route in question. The areas where the lead car is visible to the trailing car are considered safe for passing.

This method of conducting passing zone studies leaves much to be desired. For one, it is inefficient because it requires two cars to drive down the same road twice—once in each direction. It is also inaccurate because it relies on human ability to actually maintain the correct distance between the two vehicles, and on human vision to actually determine if there is an uninterrupted line-of-sight (i.e., between the trailing car and the lead car). Further, there are also costs involved with the purchasing, operating, and maintaining of the two vehicles, which can be cost prohibitive given the vast amount of currently existing roads that need to be studied.

Accordingly, those skilled in the art continue with research and development efforts in the field of passing zone and no-passing zone studies.

SUMMARY OF THE INVENTION

Disclosed herein are embodiments of a method for determining if a person's line-of-sight would be vertically obstructed from the vantage point of a location in target area. Such methods generally include the steps of: providing a vehicle equipped with a position and orientation system (POS); generating a POS data set for the target area by driving the vehicle through the target area with the POS activated; and determining if there are any vertical line-of-sight obstructions. The generated POS data set includes a plurality of POS data points, with each POS data point representing a location in the target area, and with each POS data point including both a vertical position measurement and a distance measurement. The determining vertical line-of-sight obstructions step includes: selecting a first POS data point of the POS data set, wherein the first data point represents a first location in the target area; defining a linear distance range that starts at the first data point and extends in either the forward or backwards direction for a predetermined distance; identifying POS data points of the POS data set that have a distance value within the linear distance range; selecting a second POS data point of the POS data set, wherein the second POS data point has a distance value at or near the end of the linear distance range; calculating the rate-of-change in vertical position and distance between the first and second selected POS data points; determining, based on the calculated rate-of-change, a vertical limit for each in-range POS data point; and determining, for each in-range POS data point, whether any of those POS data points have a vertical position measurement that is greater than their vertical limits.

Also disclosed herein are embodiments of a method for determining if a person's line-of-sight would be obstructed from the vantage point of a location in target area. Such methods generally include the steps of: providing a vehicle equipped with a position and orientation system (POS); generating a POS data set for the target area by driving the vehicle through the target area with the POS activated; determining if there are any vertical line-of-sight obstructions; and determining if there are any horizontal line-of-sight obstructions. The generated POS data set includes a plurality of POS data points, with each POS data point representing a location in the target area, and with each POS data point including both a vertical position measurement and a distance measurement. The determining vertical line-of-sight obstructions step includes: selecting a first POS data point of the POS data set, wherein the first data point represents a first location in the target area; defining a linear distance range that starts at the first data point and extends in either the forward or backwards direction for a predetermined distance; identifying POS data points of the POS data set that have a distance value within the linear distance range; selecting a second POS data point of the POS data set, wherein the second POS data point has a distance value at or near the end of the linear distance range; calculating the rate-of-change in vertical position and distance between the first and second selected POS data points; determining, based on the calculated rate-of-change, a vertical limit for each in-range POS data point; and determining, for each in-range POS data point, whether any of those POS data points have a vertical position measurement that is greater than their vertical limits.

Further disclosed herein are embodiments of a method for conducting a passing zone study on a road. Such methods generally include the steps of: providing a POS data set for the road; providing a lidar map representing the road that was georeferenced with the POS data set; determining if there are any vertical line-of-sight obstructions for each POS data point of the POS data; determining if there are any horizontal line-of-sight obstructions for each data point of the data set; and creating a record of each location along the road where there is no horizontal line-of-sight obstruction nor any vertical line-of-sight obstructions. The POS data set that is provided includes a plurality of POS data points, with each POS data point representing a location on the road, and with each POS data point including both a vertical position measurement and a distance measurement. The determining vertical line-of-sight obstructions step includes: selecting a first POS data point of the POS data set, wherein the first data point represents a first location in the target area; defining a linear distance range that starts at the first data point and extends in either the forward or backwards direction for a predetermined distance; identifying POS data points of the POS data set that have a distance value within the linear distance range; selecting a second POS data point of the POS data set, wherein the second POS data point has a distance value at or near the end of the linear distance range; calculating the rate-of-change in vertical position and distance between the first and second selected POS data points; determining, based on the calculated rate-of-change, a vertical limit for each in-range POS data point; and determining, for each in-range POS data point, whether any of those POS data points have a vertical position measurement that is greater than their vertical limits. The determining horizontal line-of-sight obstructions step includes: navigating to a location in the lidar map; defining a field-of-view that starts at that location and extends in either the forward or backwards direction for a predetermined distance; and determining if there are any lidar points within the field-of-view.

Other examples of the disclosed systems and methods will become apparent from the following detailed description, the accompanying drawings and the appended claims.

DETAILED DESCRIPTION

Figure 1:
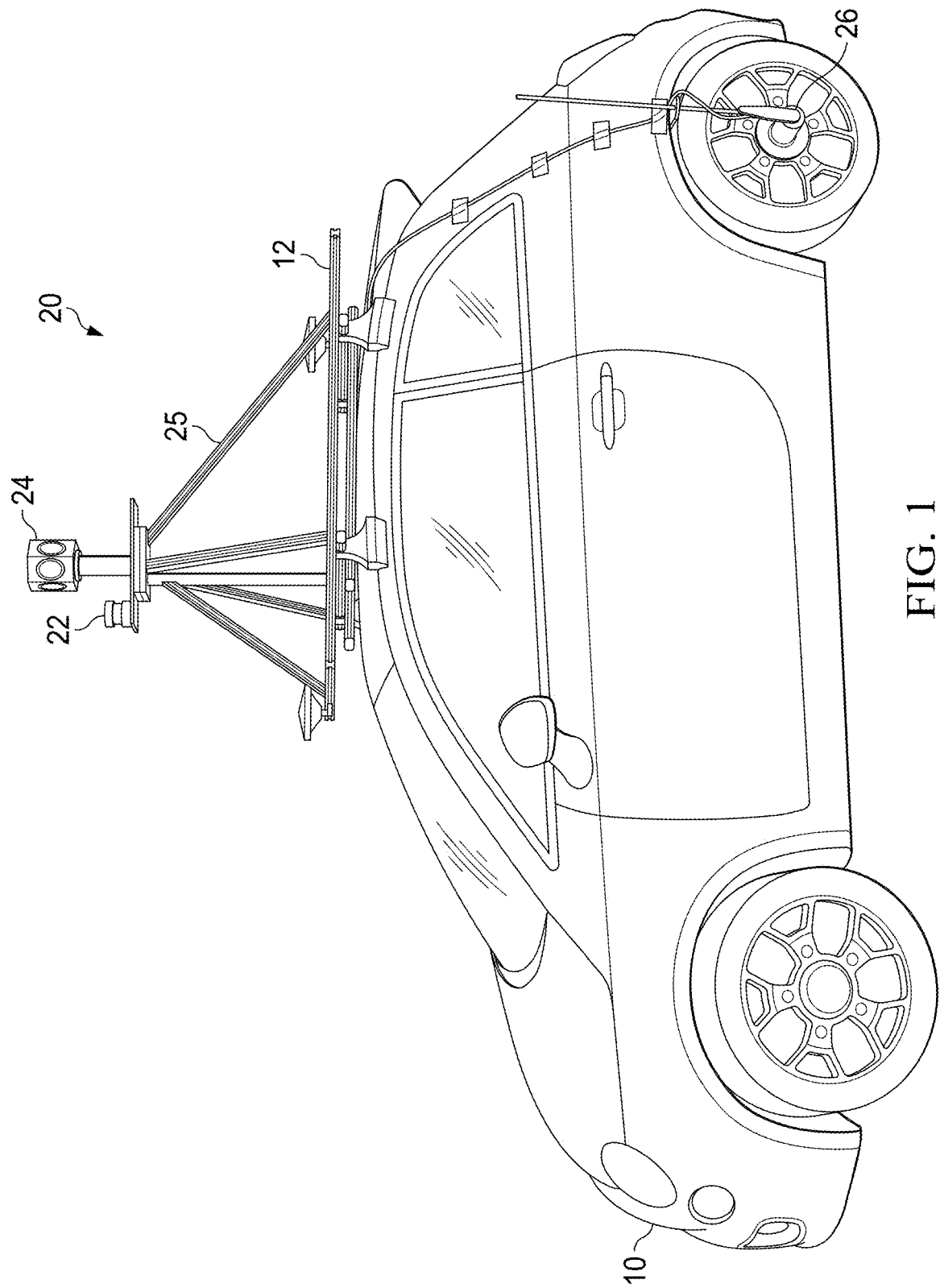
FIG. 1 is a picture showing a side view of a vehicle and a system for mobile mapping.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrase "an example" and similar language throughout the present disclosure may, but do not necessarily, refer to the same example. Further, the subject matter characterizing any one example may, but does not necessarily, include the subject matter characterizing any other example.

The System for Mobile Mapping

Referring to FIG. 1, the present disclosure provides a vehicle 10 and a system 20 for mobile mapping. The system 20 can be mounted onto the vehicle 10 and utilized to gather images and/or data about the area surrounding the vehicle 10. By driving the vehicle 10 through a target area (i.e., a geographic location) and simultaneously gathering images and/or data with the system 20, it is possible to effectively "map" the target area. While not limited to such applications, it is contemplated that the systems and methods described herein may be particularly useful for conducting passing zone studies (i.e., determining where vehicle passing zones and/or no passing zones should be on a road; also referred to as no-passing zone studies or safe passing zone studies). This is due to the system's ability to quickly and accurately gather data about the topographic features of a road (e.g., hills, valleys, etc.) as well as the objects existing in or around the road (e.g., trees, signs, bridges, tunnels, etc.). In these applications, the target area may be defined as being a short stretch of road, or multiple full-length roads in succession, or anything in-between. A route traveled by the vehicle may include one or more target areas.

Vehicle 10 is a two-door car with a roof rack and platform 12 attached on top. The roof rack supports the platform 12 from below and the platform 12 provides a structural basis for mounting one or more system 20 components. The roof rack and platform 12 enable the vehicle 10 to transport (i.e., carry) the system components along a route and through target areas. The system components may be mounted via any suitable means (e.g., adhesives, mechanical fasteners, etc.). Moreover, it is contemplated that other types of vehicles may also be suitable—e.g., vans, trucks, etc. (of any configuration).

Figure 2:
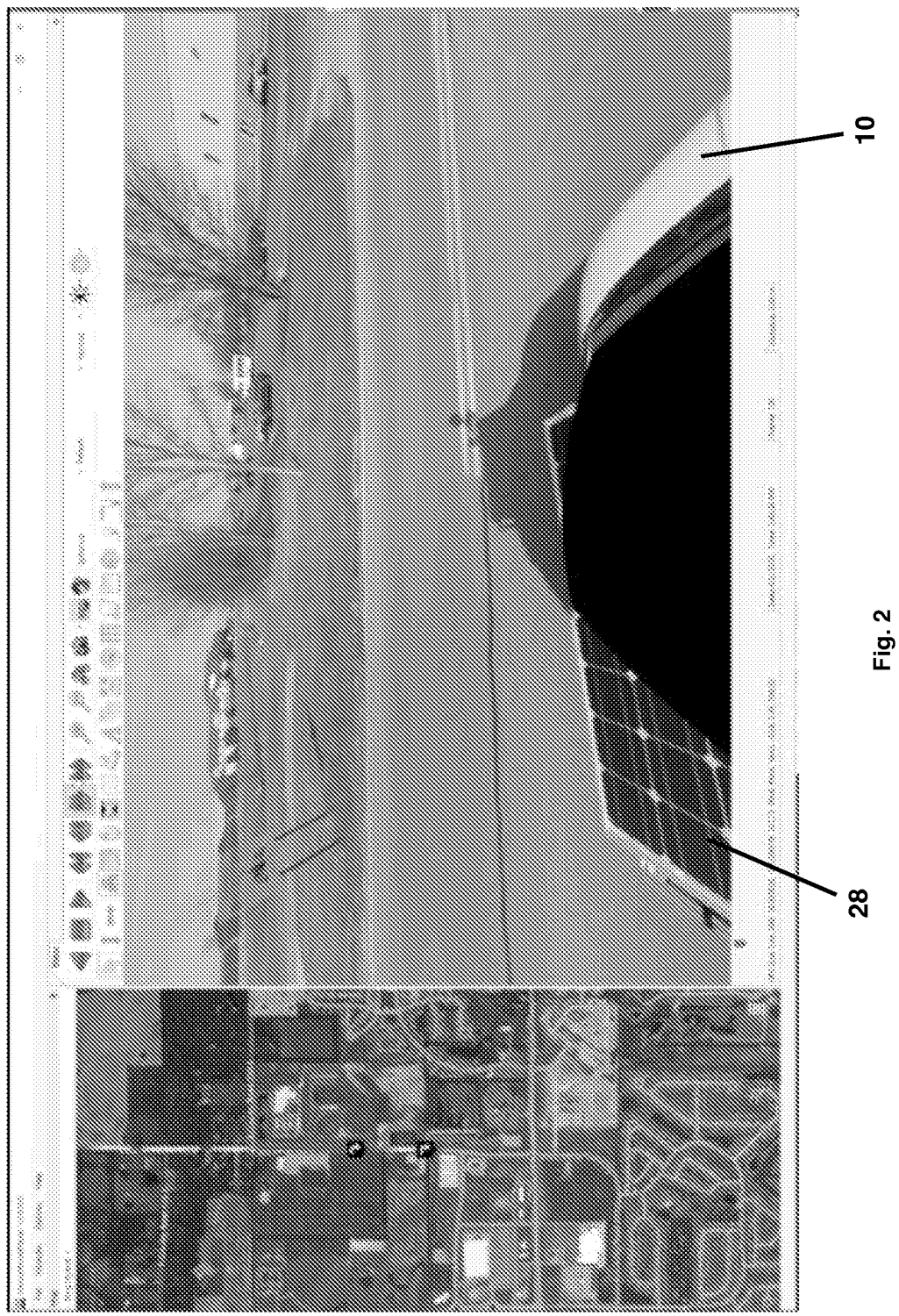
FIG. 2 is a picture showing a top view of the vehicle of FIG. 1.

Power may be supplied to system 20 and the various components thereof by any suitable means. For example, power may be supplied through the vehicle's internal battery. In another example, power may be supplied through one or more additional batteries that are separate from the vehicle 10. In yet another example, power may be supplied through one or more solar panels 28 attached to the top of the platform 12 (FIG. 2).

The system 20 of the present embodiment includes several components that enable the system 20 to generate mobile mapping data about, and images of, a target area. These system components include a position and orientation system 26 (POS), a light and ranging senor 22 (i.e., lidar), and a 360° camera 24. Each of these system components are discussed in turn below. In preferred embodiments these system components may operate in conjunction with one another to supplement the data and/or images they would otherwise collect individually.

POS 26 is a system component that tracks the position and orientation of the vehicle 10. To do so, the POS 26 incorporates a variety of sensors and subcomponents that enables it to measure various aspects about the vehicle 10 and/or the route it is traveling along (e.g., path, distance traveled, vertical position, GNSS coordinates, etc.). In the present embodiment, POS 26 includes: an inertial measurement unit (IMU) that tracks the position and orientation of the vehicle 10 over time relative to an initial start point; a distance measuring indicator (DMI) that tracks the distance traveled by the vehicle 10 from an initial start point; and a global navigation satellite system (GNSS) unit that is configured to continuously determine and record the GNSS coordinates of the vehicle 10. As those skilled in the art will appreciate, the data generated by these three POS 26 sensors—i.e., the IMU, the DMI, and the GNSS unit—can be used to supplement or compensate for one another and thereby collectively produce accurate positional information about the vehicle 10. Each of these POS sensors are described in turn below.

As used herein, the terms "GNSS unit," "GNSS coordinates," and "GNSS data" are meant to encompass components, coordinates, and data, respectively, from any suitable satellite navigation system. This may include, for example, the North American global positioning system (i.e., GPS), the Russian satellite navigation system (i.e., GLONASS), and the European satellite navigation system (i.e., Galileo), among possible others.

Figure 3:
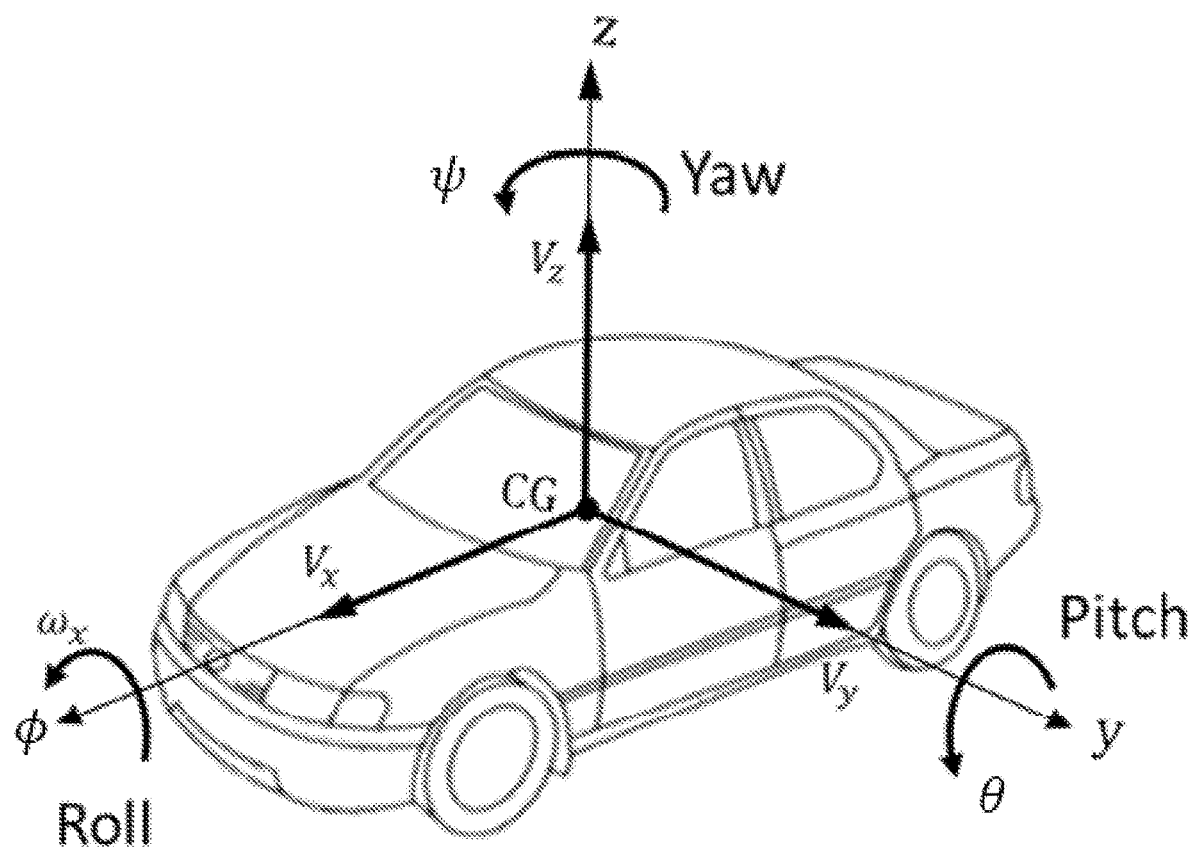
FIG. 3 is an illustration of a car with orthogonal axes overlaid on top.

The IMU of POS 26, when activated, is configured to continuously measure changes in the position and orientation of the vehicle 10 in three-dimensional space over time. Those skilled in the art will appreciate that the position and orientation of an object in three-dimensional space can be defined as being relative to a longitudinal axis, a lateral axis, and a vertical axis (FIG. 3). Theses axes are sometimes referred to as an x-, y-, or z-axis, respectively, or as a roll-, pitch-, or yaw-axis, respectively. The IMU measures the position and orientation of the vehicle 10 relative to those axes using accelerometers and gyroscopes. For example, the IMU may include three accelerometers that are arranged, aligned, or otherwise configured to measure linear acceleration along each of these three orthogonal axes (e.g., one accelerometer for each) and a gyroscope that is arranged, aligned, or otherwise configured to measure angular acceleration about the same axes. The data produced by the IMU can then be used to calculate the three-dimensional position and orientation of the vehicle 10 relative to an initial start point at various moments in time. This IMU data, when considered in aggregate, may essentially represent the vehicle's 10 three-dimensional path as it travels along a route.

Preferably, the IMU would be configured to measure the vertical position of the vehicle 10 at a one or more locations along a route. The vertical position can be measured relative to an appropriate elevation reference (e.g., as an orthometric height, ellipsoidal height, geoid height, etc.) or relative to a previously recorded position (e.g., via a dead reckoning calculation). Knowing the vertical position is useful because the vehicle 10 is subject to elevation changes as it travels over various topographic features that may exist in or around its route.

The GNSS unit of POS 26, when activated, is configured to continuously determine the GNSS coordinates of the POS 26 (which can then be attributed to vehicle 10). When the GNSS unit is activated as the vehicle 10 is traveling along a route, the GNSS unit may generate a series of GNSS coordinates (collectively referred to herein as "GNSS data") that each relate to a real-world location existing along the vehicle's 10 route. A suitable GNSS unit may include GPS antennas for generating raw observable data and GNSS azimuth measuring subsystems (GAMS) for integrating the IMU with the GPS antennas. By utilizing a carrier-phase differential GNSS algorithm to measure the relative position vector between the two antennas, the GAMS may continuously calibrate the IMU and ensure that azimuth does not drift. Moreover, the GPS unit may also include GNSS receivers for providing heading data to supplement the inertial data and software for the direct georeferencing of mobile mapping sensors using GNSS and inertial technology.

The DMI of POS 26, when activated, records an initial starting position (which may be at any point along a vehicle's route) and then continuously measures the precise linear distance traveled by the vehicle 10 from that initial starting position until it is inactivated (the linear distance measurements collectively referred to herein as "DMI data"). The linear distance measurement for a particular location in the target area may be referred to as a "distance value" (with the initial starting location having a distance value of zero, and the subsequent locations along the route having a distance value equal to their linear distance measurement). As used herein, the term "linear distance" refers to the distance traveled by a vehicle 10 as it moves forward. This term does not account for any directional changes in the straight-line path of the vehicle 10 (e.g., left- or right-hand turns, driving along curves in the road, etc.). For example, if a vehicle completed one lap around a circular road that was 50 meters in circumference, the total linear distance of that route would be 50 meters (and its distance value at the end of the lap would be 50 meters). If the same vehicle then turned around and completed a second lap in the reverse direction, the total linear distance of the route would be 100 meters. The DMI can include any suitable configuration of sensor or measuring devices capable of enabling the functions described above. In preferred embodiments, the DMI may be a wheel-mounted rotary shaft encoder that measures linear distance traveled by measuring tire rotation (as shown in FIG. 1).

An example of a POS that may be suitable for use with the present invention is the Applanix POS LV and/or the Applanix POS LV 125 available from Applanix Corp. of Richmond Hill, Ontario, Canada.

Figure 5:
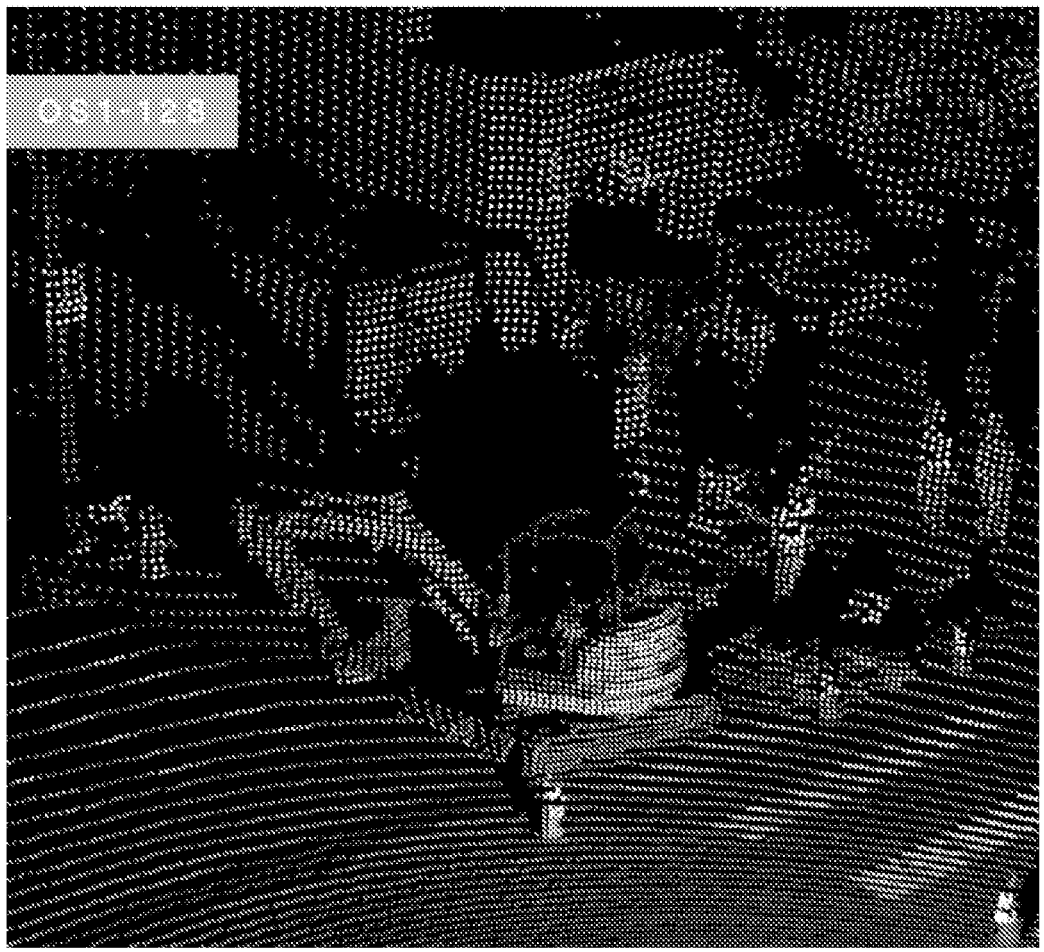
FIG. 5 is an image of a lidar map generated by the system of FIG. 1.

The lidar sensor 22 of the present embodiment may be positioned atop the mounting hardware 25, near the 360° camera 24 and in front of it. However, it is contemplated that other arrangements are possible. The lidar sensor 22 may be configured to continuously generate light pluses that reflect off various surfaces in the environment surrounding the vehicle 10 before then returning to a receiver provided on the lidar sensor 22 (this process is sometimes referred to as a "ping" or "pinging"). The lidar sensor 22 can then measure the return time of the reflected light to determine distance of those surfaces and, in turn, the objects to which those surfaces belong to. The result is the creation of a three-dimensional point cloud (consisting of lidar points and referred to herein as a "lidar map") that is reflective of, and represents, the environment (FIG. 5). Among other things, it is contemplated that use of a lidar sensor 22 may be useful for detecting obstructions in a person's horizontal field-of-view. The height at which the lidar sensor 22 is mounted does not need to be a limiting feature, but an appropriate height may be, for example, 2.5 meters above the ground.

In preferred embodiments, the lidar sensor 22 may have a range of 100 meters at >90% probability for surfaces (i.e., targets) exhibiting 80% Lambertian reflectivity; or a range of 120 meters at >50% detection probability for surfaces exhibiting 80% Lambertian reflectivity; or a range of 45 meters at >90% detection probability for surfaces exhibiting 10% Lambertian reflectivity; or a range of 55 meters at >50% detection probability for surfaces exhibiting 10% Lambertian reflectivity. In preferred embodiments, the lidar sensor may have a minimum range of 0.3 meters for a 10% reflective surface.

In preferred embodiments, the lidar sensor 22 may have a range of up to 300 meters.

In preferred embodiments, the lidar sensor 22 may have a range accuracy of ±3 centimeters for Lambertian targets and ±10 centimeters for retroreflectors.

In preferred embodiments, the lidar sensor 22 may have a 360° horizontal field-of-view and at least a 45° (i.e., +22.5° to −22.5°) vertical field-of-view.

One example of a lidar sensor that may be suitable here is the OS1 Mid-Range High Resolution Imaging Lidar Sensor available from Ouster, Inc. of San Francisco, California. In particular, it is contemplated that the Rev6 or Rev7 models of the OS1 Mid-Range High Resolution Imaging Lidar Sensor are suitable.

The 360° camera 24 of the present embodiment may be used to capture 360° images (sometimes referred to as "spherical images") of the area surrounding the vehicle 10. The 360° camera 24 may be mounted to the platform 12 atop the vehicle 10 using mounting hardware 25. Mounting height does not need to be a limiting feature, but an appropriate mounting height may be, for example, 2.5 meters above the ground. When the 360° camera is activated and the vehicle 10 is driven through a target area, the 360° camera may continuously capture 360° images at various locations throughout the target area. When those 360° images are arranged in sequence, the resulting 360° footage (i.e., video) can essentially recreate the path of the vehicle 10 through the target area as viewed by the 360° camera. An example of a 360° camera that may be suitable here can include the Mosaic 51 360° camera available from Mosaic (doing business as UNIRMI s.r.o.) of Vinohrady, Prague 2, Czech Republic. Other examples include the Ladybugs or the Ladybug6 360° spherical camera available from Teledyne FLIR LLC of Wilsonville, Oregon.

POS 26 also includes a POS Computer System (PCS) that is the central processing computer operatively connected to, and configured to control/coordinate, the various other components of the POS (including the DMI, the IMU, and the GNSS unit). To do so, the PCS may be provided with any suitable configuration of electronic circuitry capable of enabling the functions described herein, e.g., GNSS receivers, USB logging drives, central processing units, graphics processing units, random access memory, data storage, power distribution units, etc. Preferably, the PCS may be rugged, power efficient, and lightweight. Preferably, the PCS would enable raw GPS data from as few as one satellite to be processed directly into the PCS to compute accurate positional information in areas of intermittent or no GPS reception.

In addition to the system components described above, the system 20 may also include a trigger box unit for coordinating the POS 26, the 360° camera 24, and the lidar sensor 22. The trigger box unit may be configured to define a timing sequence for POS data generation, 360° camera image capture, and/or the lidar sensor pinging. Ideally, each of these system components may be configured to operate in a synchronized fashion so that they are coordinated or otherwise triggered at the same time or substantially close to the same time (e.g., the 360° camera 24 captures an image at the exact moment when the lidar sensor 22 detects objects in the area surrounding the vehicle 10 and when the POS 26 takes position and orientation measurements). To perform this function, the trigger box unit may be operatively connected to each of the aforementioned system components directly, or indirectly through the PCS of POS 26.

Data Generation, Image Collection, and Post-Processing

POS 26 may be activated when the vehicle 10 is traveling through a target area. Doing so causes POS 26 to generate IMU data, GNSS data, and DMI data (collectively referred to herein as "POS data"). Preferably, the POS data would be generated (i.e., measurements taken) at regular intervals of time or distance. For target areas that are relatively open and not crowded such that a consistent driving speed may be maintained for the vehicle 10, it is contemplated that intervals of time may be more appropriate (e.g., at a rate of 10 frames or measurements per second). However, for target areas where a consistent driving speed is not possible (e.g., stop and go traffic in major cities), it is contemplated that intervals distance may be more appropriate (e.g., at intervals of 2.0 or 2.5 meters).

As mentioned above, the IMU data includes position and orientation data about the vehicle 10 relative to an initial start point at various moments in time which, in turn, can be aggregated into a representation of the vehicle's 10 three-dimensional path through a target area. The IMU data can be supplemented by the GNSS data by using the GNSS coordinates as external reference points. That is to say, the GNSS can provide an absolute set of coordinates that can be used as the initial start point of the IMU data or as a down-route point that the IMU data must lead to. Thus, the GNSS data can help correct errors in the IMU data to minimize or even eliminate drift from the true position of the vehicle 10. At the same time, it can also be said that the GNSS data is supplemented by the IMU data since the IMU data can provide positional information about the vehicle 10 during times when GNSS data is intermittent or unavailable (i.e., it can "fill in the gaps"). Similarly, the DMI data can supplement both the IMU data and the GNSS data by serving as an independent measurement of displacement and velocity. For example, the DMI data can be used to help correct IMU data or fill in the gaps in GNSS data.

When activated for a target area, the POS 26 may generate a plurality of POS data points. As used herein, the term "POS data point" refers to a collection or set of POS data that relates or otherwise represents a specific location on in a target area. Ideally, each POS data point would include a vertical position measurement, a distance measurement (i.e., distance value), and a GNSS coordinate for the vehicle 10 at their respective locations (though in practice, this may not always be possible). All of the POS data points can then be organized into a POS data set that represents the target area as a whole. A POS data set can then, in turn, be used to extrapolate details about the topographic features existing in the target area. For example, if the POS records an increase in the vertical position of the vehicle 10 (i.e., elevation) followed by a decrease in vertical position, such information may indicate that the vehicle 10 traveled over a hill in the road. In another example, if the POS records a yaw axis rotation, such information may indicate that the vehicle 10 turned left or right going through a curve in the road. In yet another example, if the POS records a roll axis rotation, such information may indicate that the vehicle 10 traveled over a superelevation in the road (i.e., the transverse slope that is sometimes provided at curves or turns in a road to counteract the effect of centrifugal force and reduce the tendency of the vehicle to overturn or skid laterally outwards). The process described above can be repeated as many times as needed to generate additional POS data for other target areas.

In addition to the POS 26, the 360° camera 24 and the lidar sensor 22 may also be activated when the vehicle 10 is traveling through the target area. This may occur either simultaneously with the POS 26 or at different times. Doing so causes the 360° camera 24 and the lidar sensor 22 to generate 360° footage and a lidar map, respectively, of the same target area which can then be used to supplement to the data set generated by the POS 26 (by enabling the further extrapolation of details about the target area).

In some embodiments, the 360° camera 24 and/or the lidar sensor 22 (ideally both) may be configured to operate in conjunction with the POS 26 to receive and record positional information (namely, distance values and/or GPS coordinates) as they generate 360° footage and/or lidar maps, respectively. The purpose of doing so would be to relate this positional information to specific locations shown in the 360° footage and/or lidar maps. This, in turn, facilitates the association of those locations with real-world locations exiting in a target area (a process commonly known as "georeferencing"). For example, the system 20 may be configured such that the 360° camera 24 records a distance value (received from the DMI) every time it takes a 360° image. Or in another example, the system 20 may be configured such that the 360° camera 24 records a GPS coordinate (received from the GPS unit) as it takes a 360° image when the DMI measures a particular distance value or interval of distance values. In either case, the recorded GPS coordinate(s) may then be retained when the 360° image is compiled into 360° footage (either as a separate file or integrated into the 360° footage) and can later be used to reference (i.e., find) particular locations in the 360° footage (by selecting a distance value or GPS coordinate). Similarly, the lidar sensor 22 may be configured to do the same as either of the above two examples when it generates a lidar map.

Additionally, or alternatively, the 360° footage and/or lidar maps may be georeferenced using an appropriate post-processing software. The post-processing software may utilize the POS data to assign a geographical location on the earth (e.g., a GNSS coordinate) to a pixel from a camera image or a digital point from a laser. The post-processing software may utilize various methods of georeferencing, such as direct georeferencing or aerial triangulation (e.g., using on-Earth base stations, satellites orbiting the Earth, etc.). Examples of post-processing software that may be suitable here include the POSPac mobile mapping system available from Applanix Corp. of Richmond Hill, Ontario, Canada and/or the Trimble CenterPoint RTX available from Trimble Inc. of Westminster, Colorado.

Making Line-of-Sight Determinations

Once the system 20 has generated data and gathered images, the data and images can then be analyzed to determine if there are any line-of-sight obstructions at a particular location in a target area. Doing so requires: (1) determining if there are any vertical line-of-sight obstructions within a predetermined distance of that location, and (2) determining if there are any horizontal line-of-sight obstructions within a predetermined distance of that location. If there are no vertical or horizontal line-of-sight obstructions, then that location can be deemed as being generally free of any line-of-sight obstructions.

Figure 4:
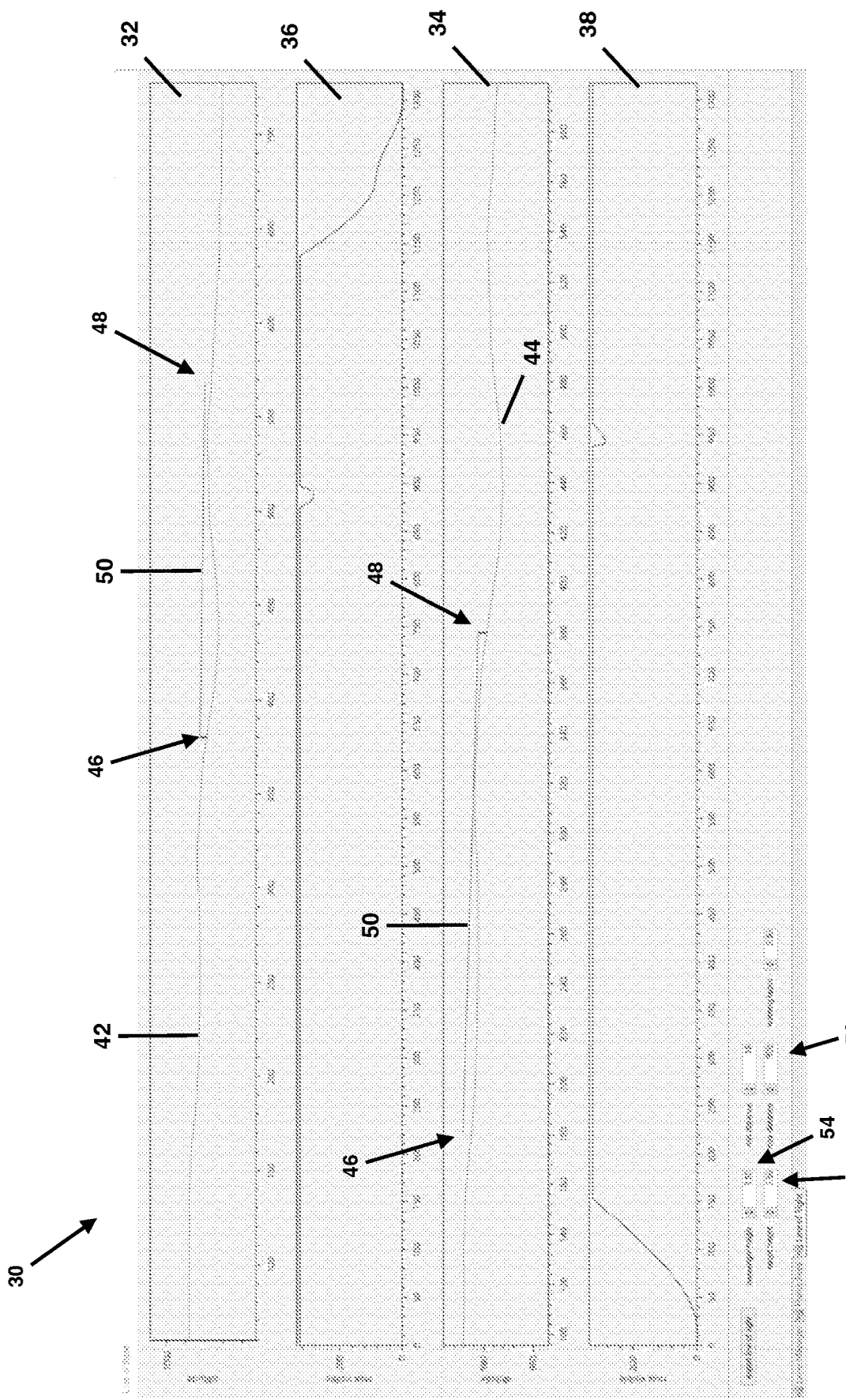
FIG. 4 is the graphical user interface of a first computer application for processing POS data.

Referring to FIG. 4 the present disclosure provides an exemplary embodiment of a computer application (herein, a "first computer application"). The first computer application can be used to process a POS data set and determine if there are any vertical line-of-sight obstructions at a plurality of locations in a target area. As shown, the first application includes a graphical user interface 30 that may be configured to generate two types of graphs using the data set data points—vertical line-of-sight graphs 32 and 34, and max visible graphs 36 and 38.

The vertical line-of-sight graphs 32, 34 plot the POS data points (i.e., distance as the independent variable and vertical position as the dependent variable) to generate graphed lines 42 and 44. The various curves defined in these graphed lines 42, 44 are reflective of real-world topographic features existing in a target area that caused the vehicle 10 to either elevate or descend when the vehicle 10 was driven over it. With the data points arranged in sequence (based on distance values) it becomes possible to simulate down-route (i.e., forward-looking) line-of-sights and/or up-route (i.e., backward-looking) line-of-sights for any given data point of the data set (more on that below). Notably, vertical line-of-sight graph 32 and max visible graph 36 both relate to forward-looking simulated line-of-sights; and vertical line-of-sight graph 34 and max visible graph 38 relate to backwards-looking simulated line-of-sights.

In other embodiments, it is contemplated that the vertical line-of-sight graphs 32, 34 may be generated based on a sequence of a different parameter rather than distance values (e.g., GNSS coordinates). Variations such as these will not result in a departure from the scope of the present disclosure.

To make line-of-sight determinations, the first computer application (or a user thereof) may start by selecting a POS data point from a POS data set to analyze (referred to herein as a "first selected data point"). As previously mentioned, the first selected data point (like all data points of the data set, selected or otherwise) represents an actual location existing in the target area (that location being referred to herein as the "first selected location"). Then, the first computer application may identify a linear distance range that starts at the first selected data point and extends for a predetermined distance in either the forward or backwards direction. For example, if the first selected data point had a distance value of 50 meters and the predetermined distance is 20 meters in the forward direction, then the linear distance range would be from 50 meters to 70 meters. With the linear distance range identified, the first computer application can then identify each POS data point within the linear distance range (e.g., having a distance value in-between 50 meters and 70 meters). These are the POS data points that will be evaluated to determine if there are any vertical line-of-sight obstructions from the vantage point of the first selected location.

To evaluate the POS data points, the first computer application will select a data point that is either at or near the end of the linear distance range (e.g., having a distance value equal to or near 70 meters; this data point is referred to herein as the "second selected data point") and then calculate the rates-of-change in elevation (i.e., vertical position) and distance between the first and second selected data points. In other words, the first computer application conceptualizes a line being drawn between the first selected data point and the second selected data point and then calculates the slope of that line. This line can be depicted graphically— e.g., ref. no. 50 in graphs 32 and 34, respectively—but does not need to be. In any case, with the slope calculated the first computer application can then proceed to calculate a threshold vertical position (referred to herein as a "vertical limit") for each data point within the linear distance range. If any of those data points have a vertical position measurement that is equal to or greater than its vertical limit, then that indicates that the simulated line-of-sight is broken and that there is likely to be a vertically obstructed line-of-sight at the real-world location represented by the first selected data point. As needed or desired, this process can then be repeated for the opposite direction so that both the forward line-of-sight and the backwards line-of-sight is evaluated for vertical obstructions. Moreover, this process can also be repeated for other POS data points to determine if any of the locations represented by those POS data points would have a vertically obstructed line-of-sight.

Preferably, the first computer application would also calculate, for each POS data point of a POS data set, the degree or extent to which a simulated line-of-sight (either forwards or backwards) is vertically obstructed by another POS data point in its linear distance range. It is contemplated that there may several ways of performing such calculations. In one example, these calculations may be calculated as an absolute value difference between the simulated line-of-sight and the vertical position measurement of a POS data point (e.g., if the vertical limit is 10 meters and the vertical position measurement is 8 meters, then the absolute value difference would be 2 meters). In another example, these calculations may be calculated based on a percentage of a vertical range (e.g., a simulated line-of-sight may define an upper boundary at 10 meters and a lower boundary at 8 meters; if the vertical position measurement of a POS data point is 9 meters, then the simulated line of sight would be 50% obstructed). These calculations can then be used to generate max visible graphs 36 and 38 (with distance as the independent variable and percent visibility as the dependent variable). These graphs 36, 38 are provided to indicate the extent to which a person's vertical line-of-sight is obstructed at various locations in a target area. When the plotted line is at the maximum value, the person's vertical line-of-sight is unobstructed. Where the line dips (e.g., at distance value 890 in graph 36 and distance value 940 in graph 38), the driver's vertical line-of-sight is obstructed at least to some extent.

FIG. 4 depicts an embodiment of the first computer application that was specifically configured for passing zone studies and has processed a data set that was generated for a road. In vertical line-of-sight graphs 32 and 34 the first selected data point is identified by marker 46 (shown in blue) and the second selected data point is identified by marker 48 (shown in green). Since marker 48 is to the right of marker 46 in graph 32, that indicates that graph 32 is tracking a forward line-of-sight. On the other hand, since marker 48 is to the left of marker 46 in graph 34, which indicates that graph 34 is tracking a backwards line-of-sight. Markers 46 and 48 in both vertical line-of-sight graphs are separated by a predetermined distance of 900 feet, as indicated by the inputted value in the "max distance" field 52. Those skilled in the art will appreciate that many relevant traffic regulations require predetermined distances for an unobstructed driver line-of-sight before there can be a passing zone designated at a given location on a road (e.g., Section 36.01 of the Manual on Uniform Traffic Control Devices by the Federal Highway Administration of the U.S. Department of Transportation). These predetermined distances may be based on vehicle speed (e.g., 900 feet for 55 miles per hour traffic; see, e.g., Table 3B-1 of Section 36.01). Raising or lowering the inputted value changes the linear distance range and the second selected data point.

Vertical line-of-sight graphs 32 and 34 also graphically depicts simulated line-of-sight lines 50 which connects the markers 46, 48 of these respective graphs. Notably, the simulated line-of-sight lines 50 can be shifted upwards or downward by adjusting the vertical position measurements of the first and second selected data points (referred to herein as a "first and/or second adjusted vertical position"). Here, the first and second selected data points are adjusted to an adjusted vertical position that corresponds to a height of 3.5 feet above ground level, as indicated by the inputted values in the "passenger height" and "target height" fields 54, 56, respectively. Those skilled in the art will further appreciate that many traffic regulations require that passing zone studies measure driver line-of-sight from a vantage point that is 3.5 feet above the ground (e.g., Section 3B.02-04 of the Manual on Uniform Traffic Control Devices by the Federal Highway Administration of the U.S. Department of Transportation), which is thought to be (approximately) the average height of a driver's eyes when sitting in the driver seat of a vehicle.

Referring to FIG. 5, the present disclosure provides an example of a lidar map that was generated by the lidar sensor 22 of the system 20. This lidar map includes an array of lidar points that indicate where light was reflected off a surface (and thus, where an object is). Notably, the lidar points may be color coded to indicate their distance from the vantage point of the lidar sensor (e.g., in yellow, orange, magenta, or purple, with yellow being the closest and purple being the furthest).

A lidar map generated by the lidar sensor 22 of the system 20 that has been georeferenced can be opened using an appropriate computer application and then utilized to determine if there are any horizontal line-of-sight obstructions at various locations in a target area (more on that below). As shown, the lidar map is essentially a recreation of a target area (or portions thereof) in point cloud form. The lidar points that make up the lidar map are defined in three-dimensional space and may, either individually or collectively, represent objects existing in or around the target area. Thus, the positions of these lidar points relative to various locations in the lidar map may reveal whether there are objects in the real-world that would obstruct a person's line-of-sight.

Figure 6:
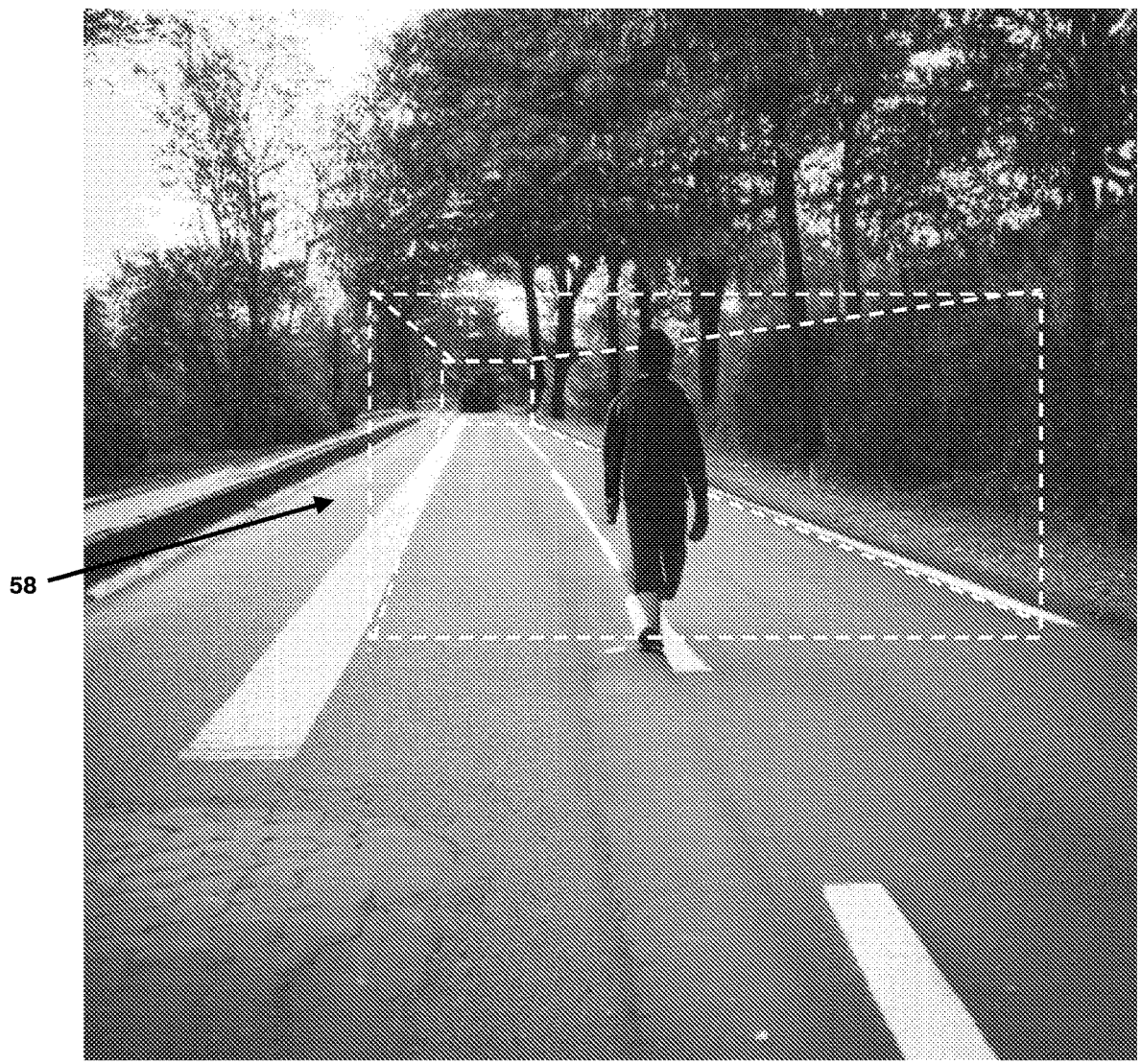
FIG. 6 is a picture of a person walking down a road with a simulated field-of-view overlaid on top.

Referring to FIG. 6, the present disclosure provides a picture of a person walking down a road with a hypothetical field-of-view 58 defined. This figure is solely meant to help conceptualize a way in which a lidar map may be used to determine if there are any horizontal line-of-sight obstructions at a particular location in a lidar map.

To analyze a location in a lidar map for any horizontal line-of-sight obstructions, the computer application may first define a simulated field-of-view 58 in the lidar map. The simulated field-of-view 58 starts at the location and can extend either down-route or up-route for a predetermined distance (namely, the same predetermined distance used for making the vertical line-of-sight determinations). The simulated field-of-view 58 can be defined in any shape and size to accommodate various use-cases. Here, the simulated field-of-view 58 is shown as being generally polygonal in shape and extending down-route until it reaches a tunnel. With the simulated field-of-view 58 defined, the computer application may then determine if there are any lidar points that encroach within the simulated field-of-view 58. If so, then that there is likely a real-world object that would obstruct a person's down-route horizontal-line-of-sight if that person was standing at the location.

Referring to FIGS. 7-10, 360° footage generated by the 360° camera 24 of the system 20 that has been georeferenced can be viewed using an appropriate computer application and then utilized to determine if there are any horizontal line-of-sight obstructions at various locations in a target area. It is contemplated that doing so may serve either as an alternative method of identifying horizontal line-of-sight obstructions (as opposed to the lidar method describe above) or as an additional method to check for efficacy. After the 360° footage is loaded onto the computer application a person reviewing the footage may navigate to one or more locations shown and then visually determine if there are any horizontal line-of-sight obstructions at those locations.

At this point, those skilled in the art will appreciate that the methods described above may be applicable to conducting passing zone studies. If there are no vertical line-of-sight obstructions nor any horizontal line-of-sight obstructions for a predetermined distance from the vantage point of a particular location in the target area, then that indicates that it is likely safe to place a passing zone at that location. If there are vertical and/or horizontal line-of-sight obstructions, then that would likely merit a no-passing zone at that location.

Furthermore, it should be noted that the methods described above are capable of determining whether there are any vertical or horizontal line-of-sight obstructions based on the data and/or images that was collected by driving the vehicle 10 through a target area once and only in one direction. Thus, if the methods described above are used for passing zone studies, it is contemplated that they would represent an improvement over the traditional way of performing passing zone studies since the traditional way of performing passing zone studies required two vehicles driving across a road twice—once in both directions. Moreover, the methods described herein may also eliminate the human error that is inherent to traditional passing zone studies since the methods of the present invention do not rely on human eyesight. Further, consistency is greatly improved as traditional passing zone studies struggle to maintain designated in-field vehicle distance separation. Quality control and quality assurance are also greatly improved over traditional passing zone study methods as passing and no passing zones can be reviewed indefinitely within a controlled environment (rather than in-field, on the road). In summation, the methods described herein are simply more efficient, accurate, and safe than the traditional way of performing passing zone studies.

Generating a Report

After determining which locations in a target area have obstructed or unobstructed lines-of-sight (which includes both vertical and horizontal), a record of these determinations may be created. This record can then be used as or for a passing zone study. FIGS. 7-17 provide exemplary embodiments of two computer applications that can be utilized to produce such a record.

Figure 7:
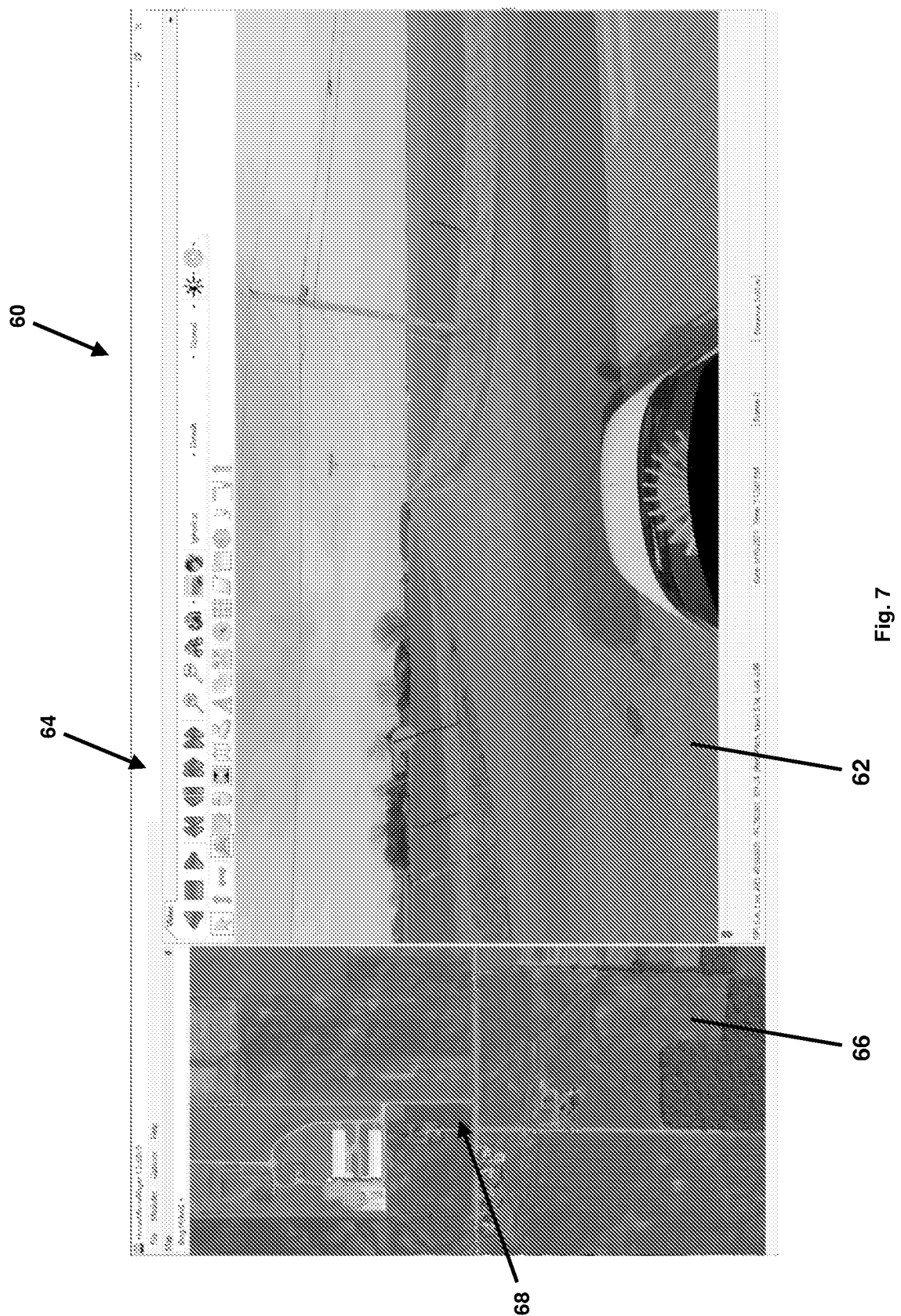
FIGS. 7-10 are screenshots of the graphical user interface of a second computer application that shows the path of a vehicle traveling along a route.

Referring to FIG. 7, the present disclosure shows the graphical user interface 60 of a second computer application. The second computer application is configured to utilize the GNSS data and the 360° video footage collected by the system 20. As shown, the second computer application includes a video player 62 and orthographical map 66.

Figure 9:
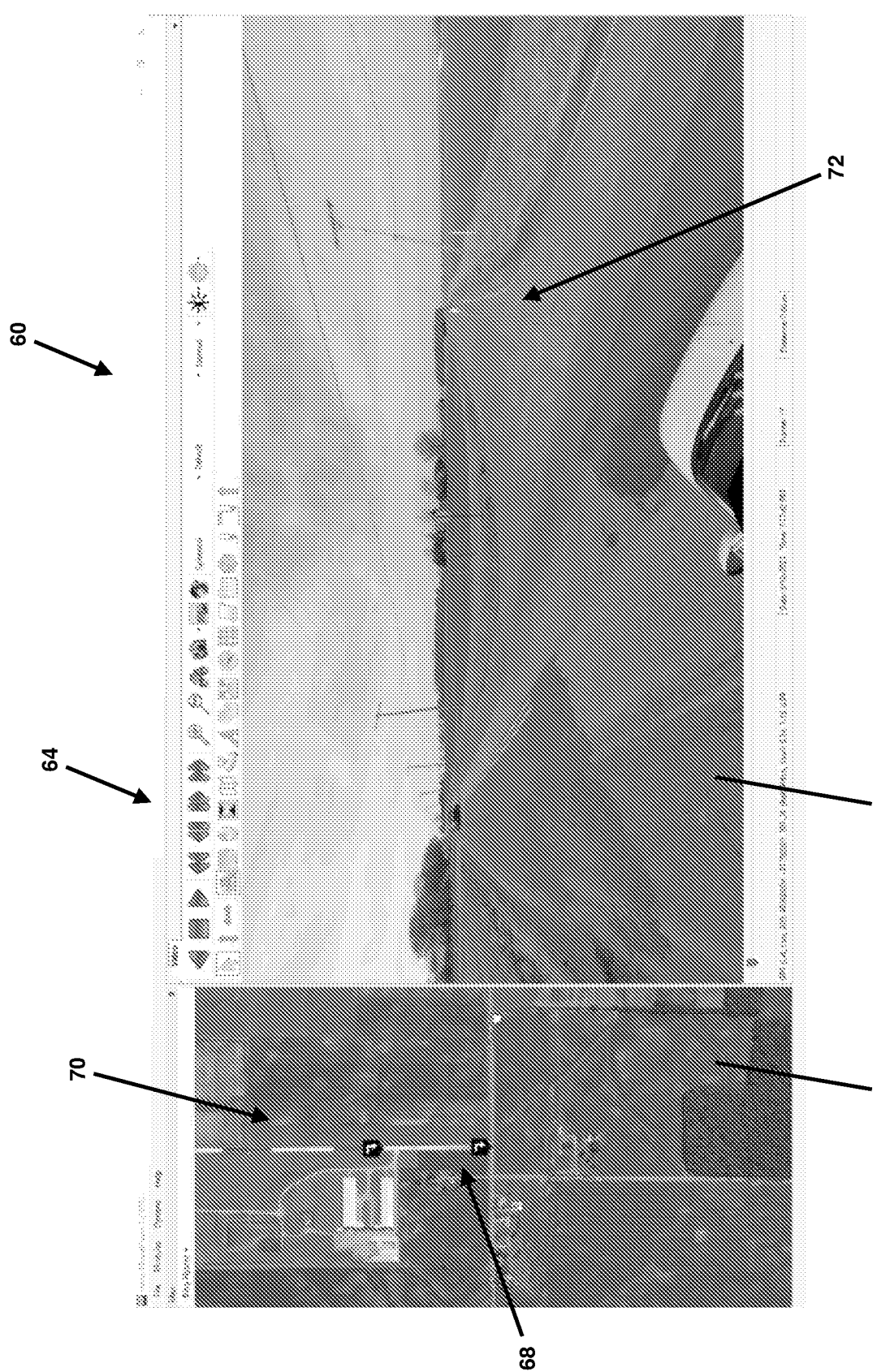
Figure 10:
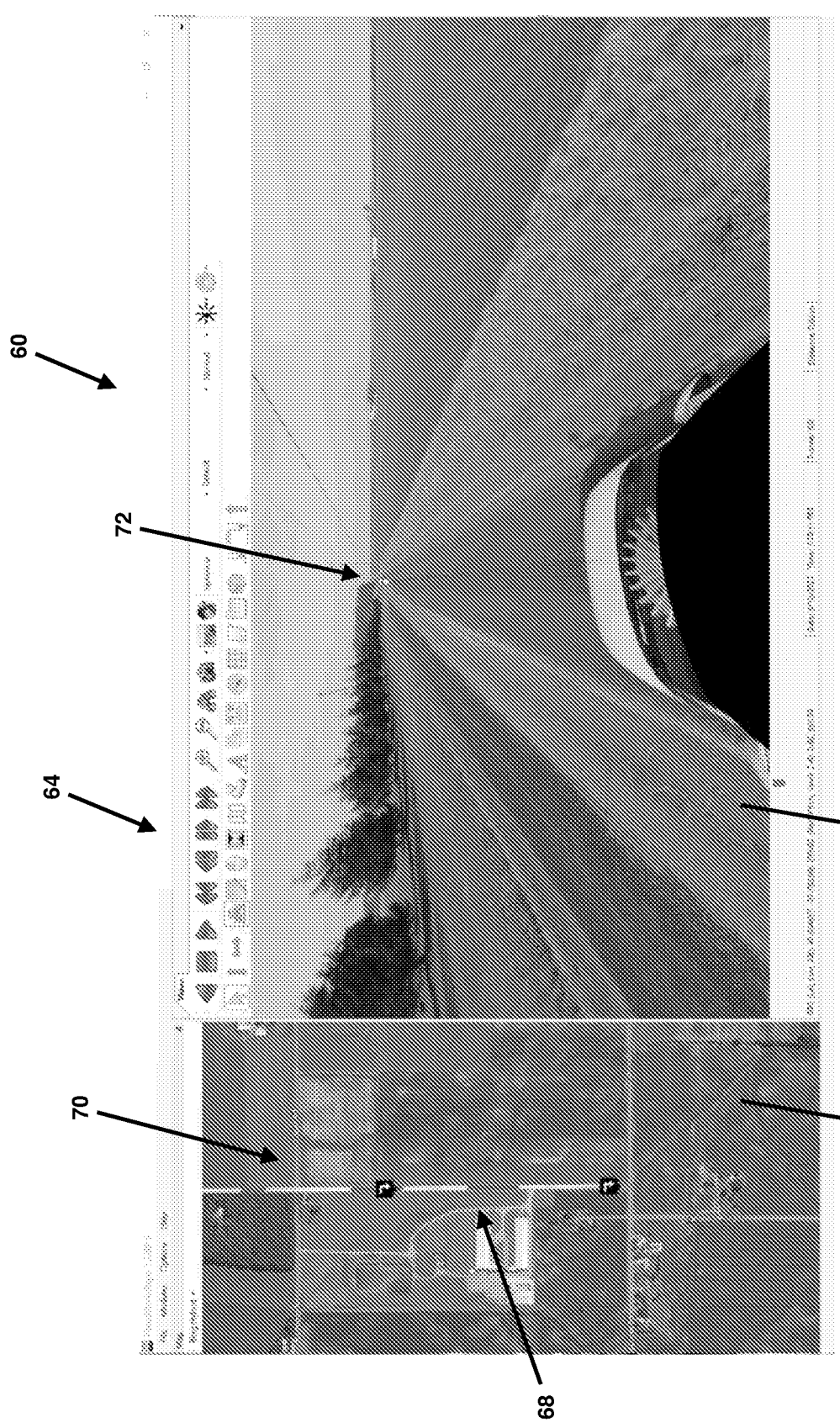

The video player 62 may be configured to play 360° video and while also enabling perspective control (FIGS. 9 and 10). Video controls 64 enable video playback control, and can include buttons for play, stop, forward, skip forward, back, and skip back. Forward and back controls may change the video footage by one frame in either direction. The skip forward and skip back controls may change the video footage by a predetermined number of frames in either direction.

The orthographical map 66 shows the geospatial location of the vehicle 10 corresponding to its location in the video player 62. The location of the vehicle 10 in the orthographical map 66 may be indicated by location marker 68. Ideally, the orthographical map 66 and the video player 62 would operate in sync such that the location marker 68 in the orthographical GPS map 66 changes as the vehicle is traveling down a road in the video player 62 (see FIGS. 7 and 9).

Figure 8:

Further, the second computer application may be synced and utilized in tandem with the first computer application. More specifically, the first computer application may display POS data (and the corresponding graphs) associated with the particular road shown in the video player of the second application. Each distance value shown in the graphs corresponds to a real location on the road shown in the orthographical map 66. And since line-of-sight information (i.e., whether or not it is interrupted, and how close it is to getting interrupted) is already calculated for each distance value, it is possible to integrate this data with the 360° video footage and the orthographic map 66 in the form of layers 70, 72 overlaid on top of the 360° video footage and the orthographic map (FIG. 8). This makes it easy to see from a first-hand perspective and from an orthographic perspective the precise spots on the road where driver line-of-sight is obstructed (red), close to being obstructed (yellow), and/or not obstructed at all (green). The colors shown here may be determined as a function of driver visibility. For example, green may indicate 100% unobstructed driver vertical line-of-sight; yellow may indicate 90-99% unobstructed driver vertical line-of-sight; and red may indicate 89% or less unobstructed vertical line-of-sight. The threshold for "close to being obstructed" may be set by inputting a value in the warning factor input field in the first computer application. The warning factor is a setting that determines at what point the first computer application recognizes that the driver's vertical line-of-sight is close to being obstructed. Here, it is set to 0.90 which correlates to a "close to be obstructed" designation when the driver's line-of-sight is obstructed by 10% (of i.e., the driver has 90% visibility).

Still further, the first computer application may be configured such that the vehicle markers 46, 48 in the vertical line-of-sight graphs 32, 34 move left to right corresponding with the changing location of the vehicle shown in the video player 62. Thus, by observing the line-of-sight lines 50 as the video plays, a user may easily spot the precise moment when driver line-of-sight is obstructed (indicated when the line-of-sight lines 50 intersect the graphed line 42, 44) or is close to being obstructed.

In one or more embodiments, the first and second computer applications may be integrated into a single computer application. One example of a computer application that is capable of integrating the functions described above of both the first and second computer applications is Horus Media Player available from Geosuite.

Figure 11:
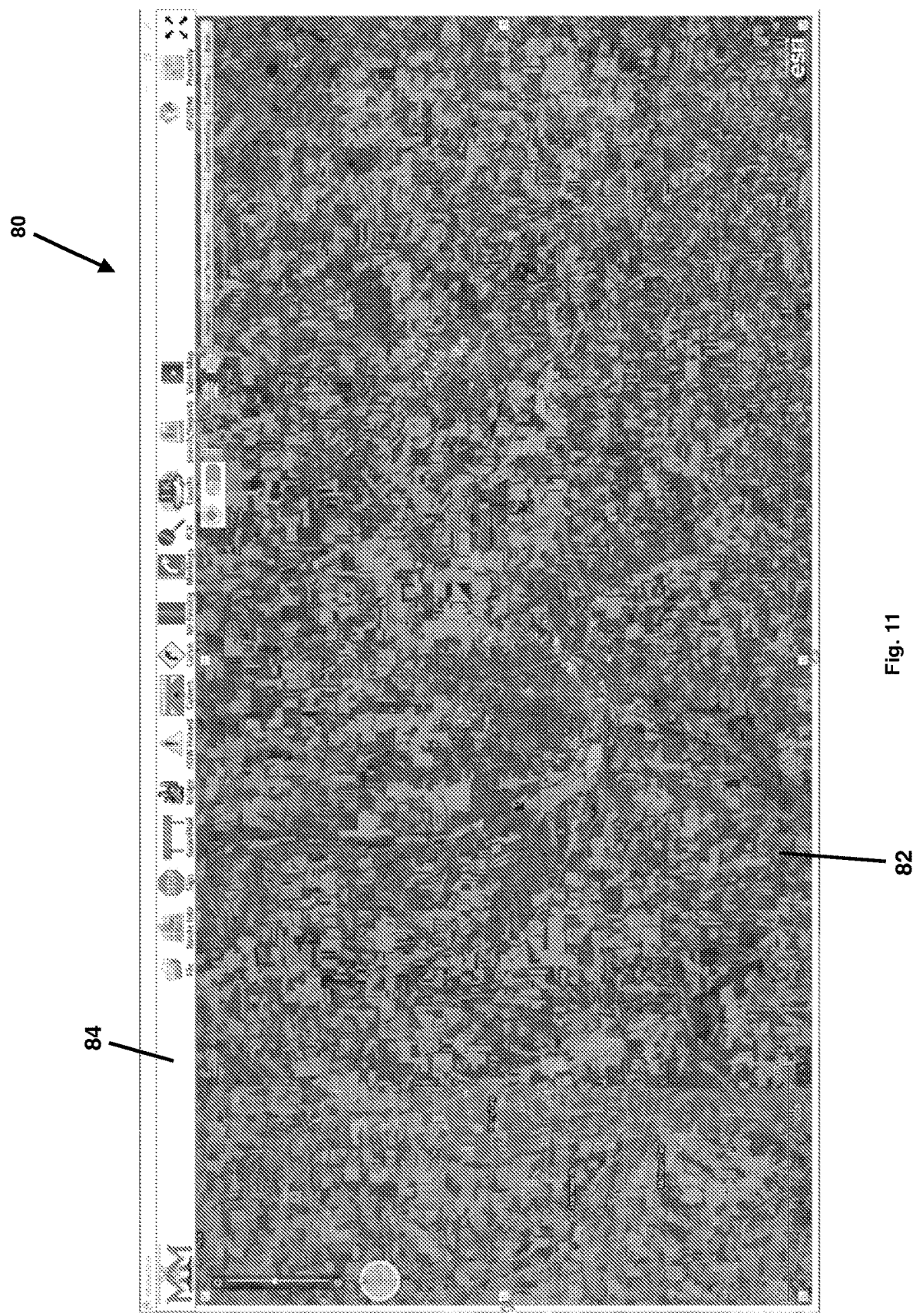
FIGS. 11-16 are screenshots of the graphical user interface of a third computer application for generating a record of line-of-sight determinations.
Figure 12:
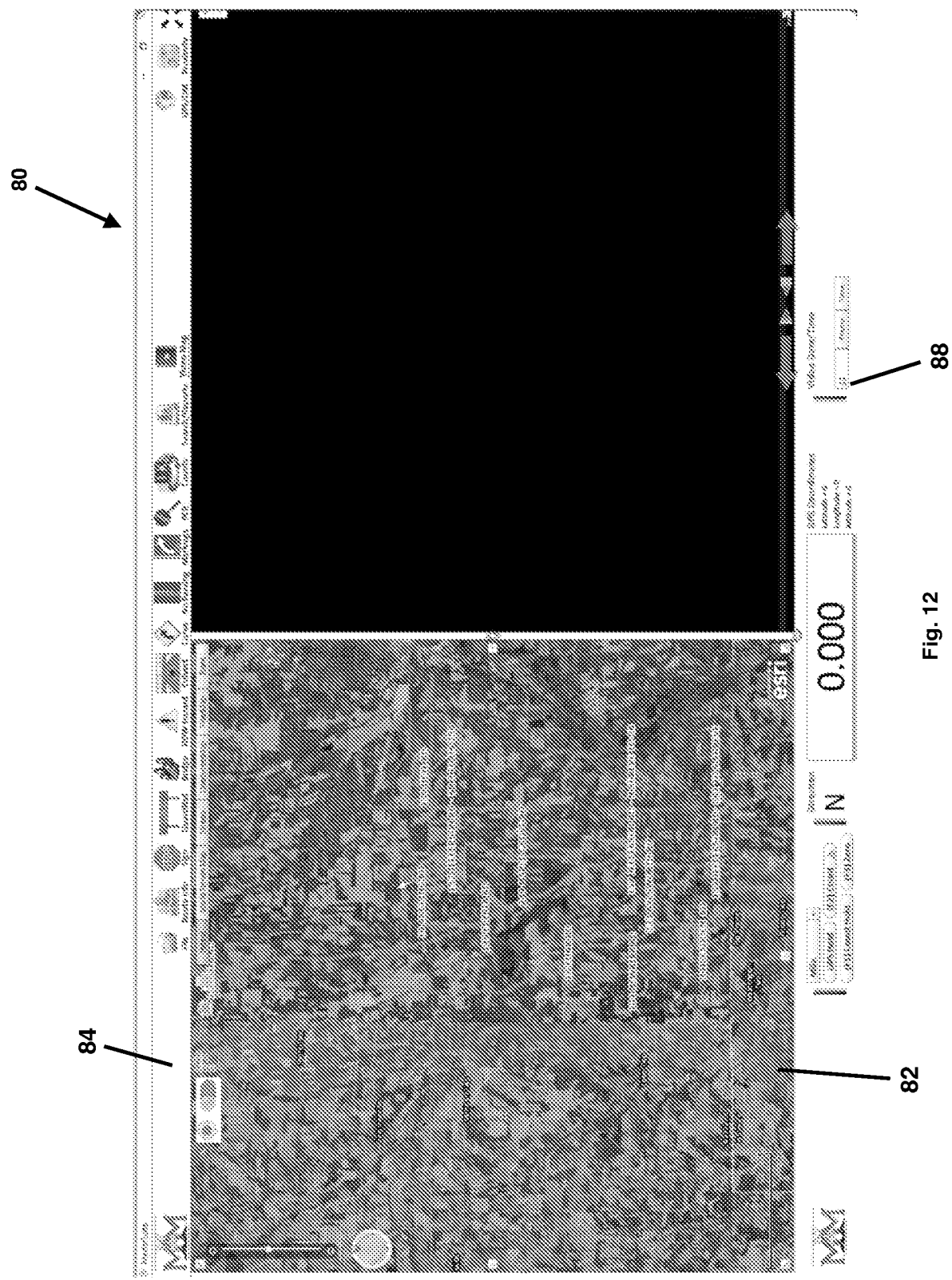
Figure 13:
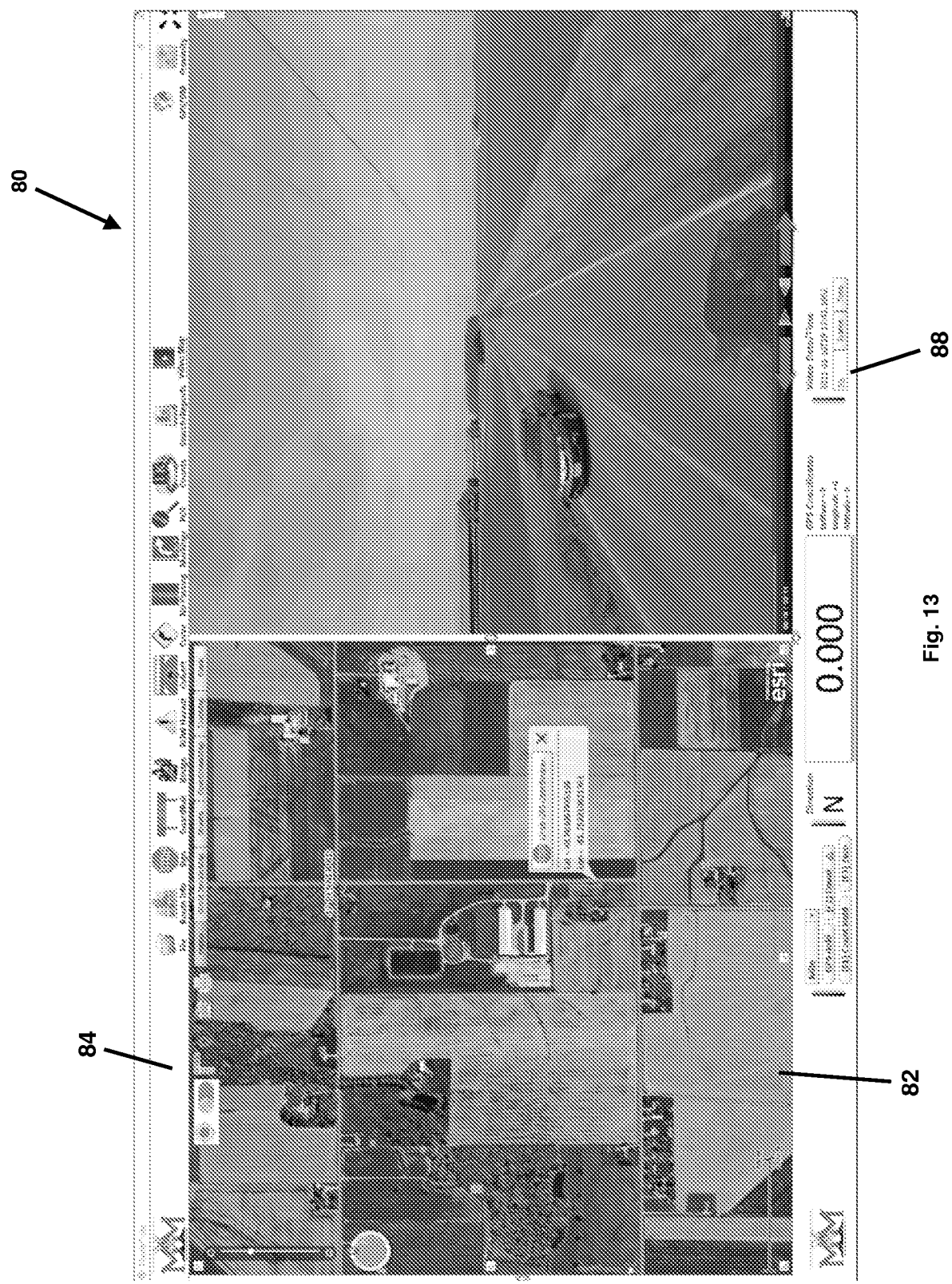

Referring to FIG. 11, the present disclosure shows the graphical user interface 80 of a third computer application. The third computer application may be utilized to establish a record of road features including, but not limited to, no passing zones. The third computer application may also generate a report for a road based on the record that was established. As shown, the third computer application includes an orthographic map 82 of a geographic location (in this case, Wyandot County, Ohio). Using the GNSS data collected by the system of FIG. 1, the third computer application may highlight, on the orthographic map, the roads that were mapped (FIG. 12). These highlights may be selectable to focus the application on a particular road (FIG. 13) (in this case, Benner Rd.).

Figure 14:
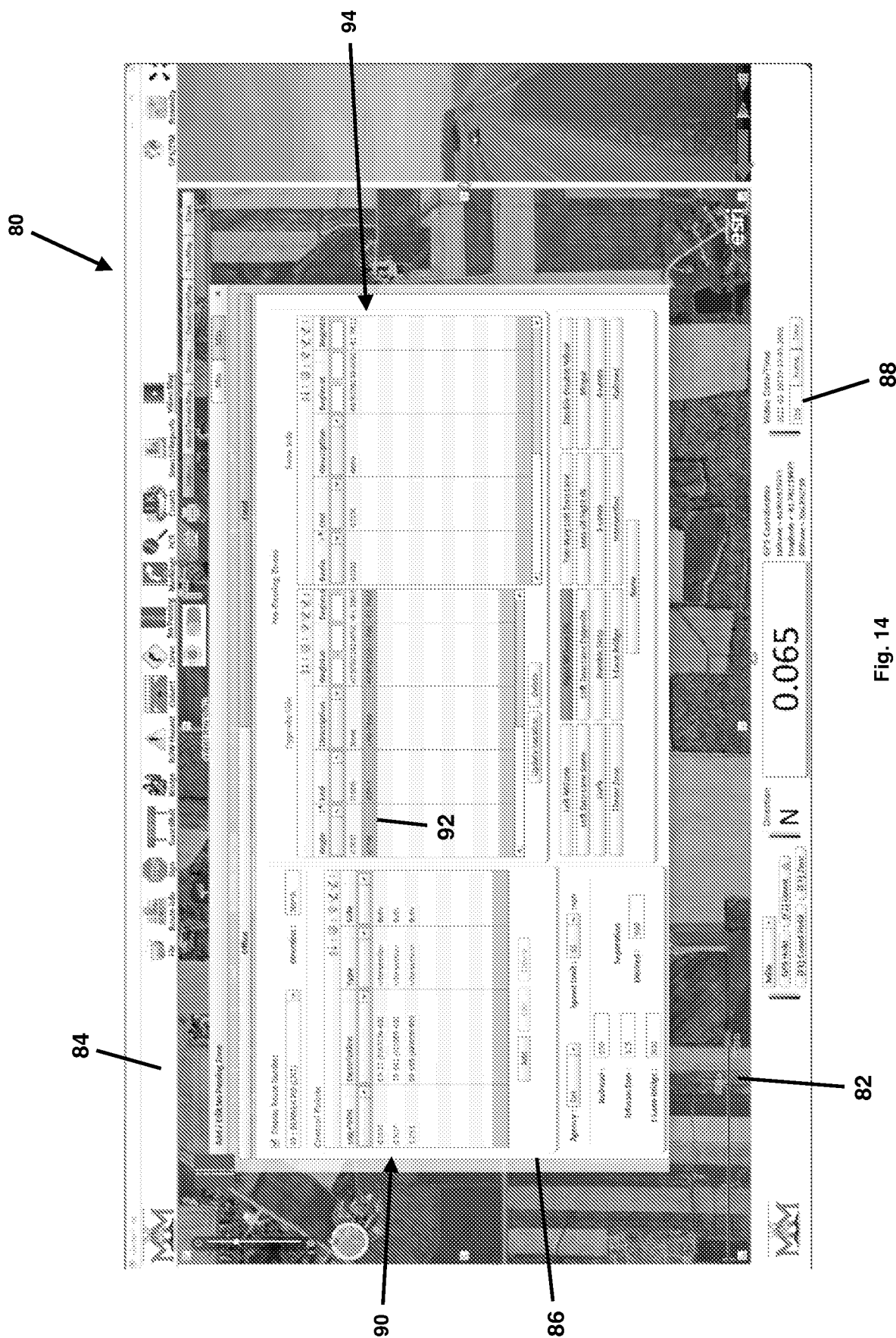
Figure 15:
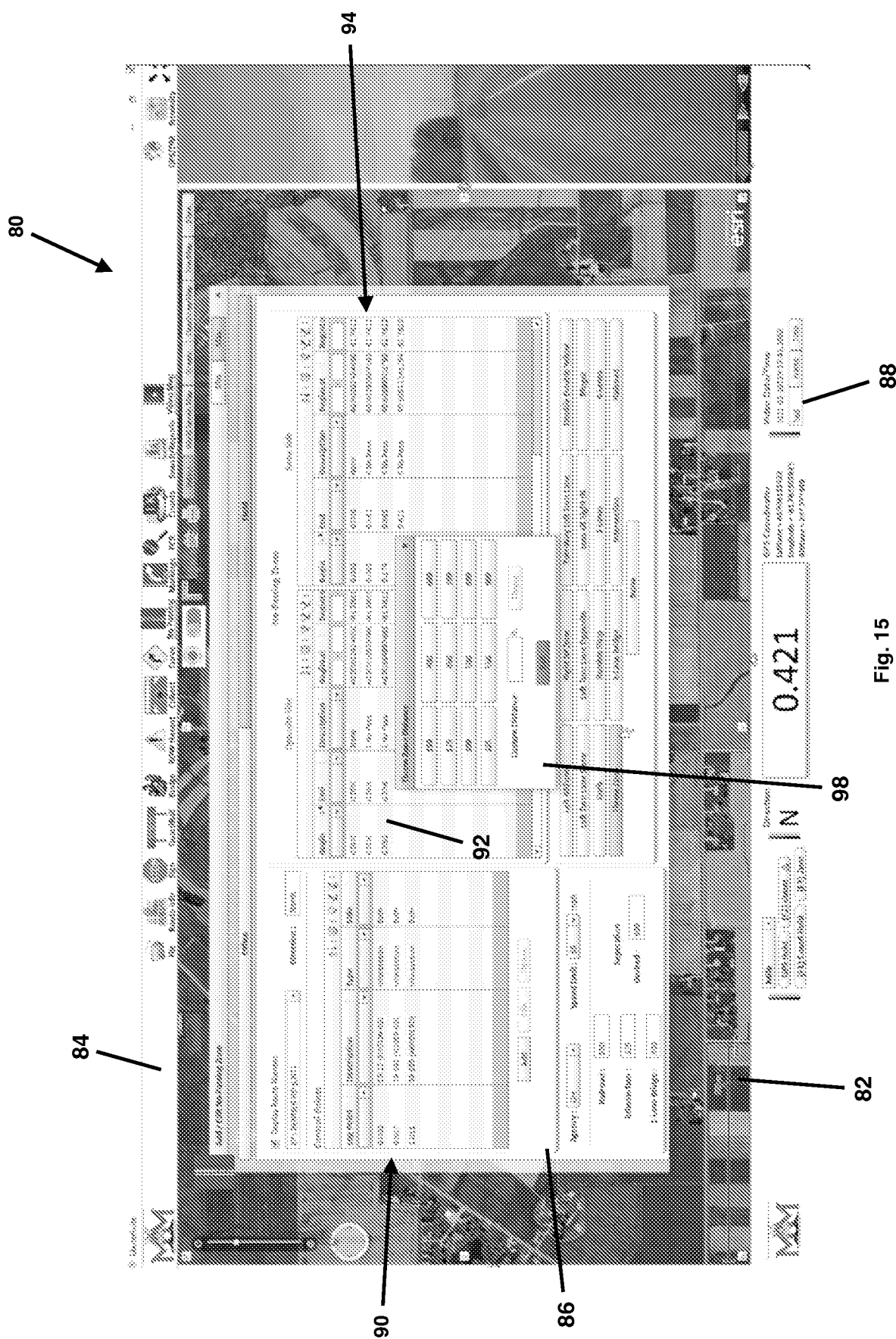

In addition, the graphical user interface 80 of the third computer application may feature a toolbar 84 containing selectable buttons for various functions. Referring to FIG. 14, a user may select the no passing button to utilize the no passing module 86. From here, a user can create records of various road features (discussed in greater detail below).

The third computer application may be synced and utilized in tandem with the first and second computer applications. As shown, the graphical user interface 80 of the third computer application may include a bottom menu bar 88 indicating the frame of a 360° video that is being played by the video player 62 of the second computer application. The third computer application may also be configured to keep track of the distance value and the GNSS coordinates associated with that frame.

The no passing module 86 includes a field for control points 90. As used herein, the term "control point" refers to relevant locations on the orthographic map 82 that defines a route. For example, in FIG. 14 three control points are shown—Fulton Rd., Yoder Rd., and Akron Rd. Thus, a route is defined that starts at the intersection of Benner Rd. and Fulton Rd, goes past Yoder Rd., and ends at Akron Rd.

The no passing module 86 includes a plurality of selectable buttons that correspond to various road features and user determinations about the road. For example, there are buttons for railroads, intersections, rumble strips, and curbs, among other things. There are also buttons for left and right no pass zones ("Left NPZone" and "Right NPZone") for indicating that a road, at the current frame and distance value, is not suitable for passing (i.e., is a "no pass zone"). The Left NPZone button corresponds to the left lane from the first-person perspective of the video, and the Right NPZone button corresponds to the right lane. Further, there is also a "Throw Zone" button that can preemptively declare a set distance either in front of or behind the position of the vehicle as being a no pass zone. Selecting the Throw Zone button brings up a window 98 with selectable buttons corresponding to various distances. There can also be an input field for the user to input a custom distance.

Figure 16:
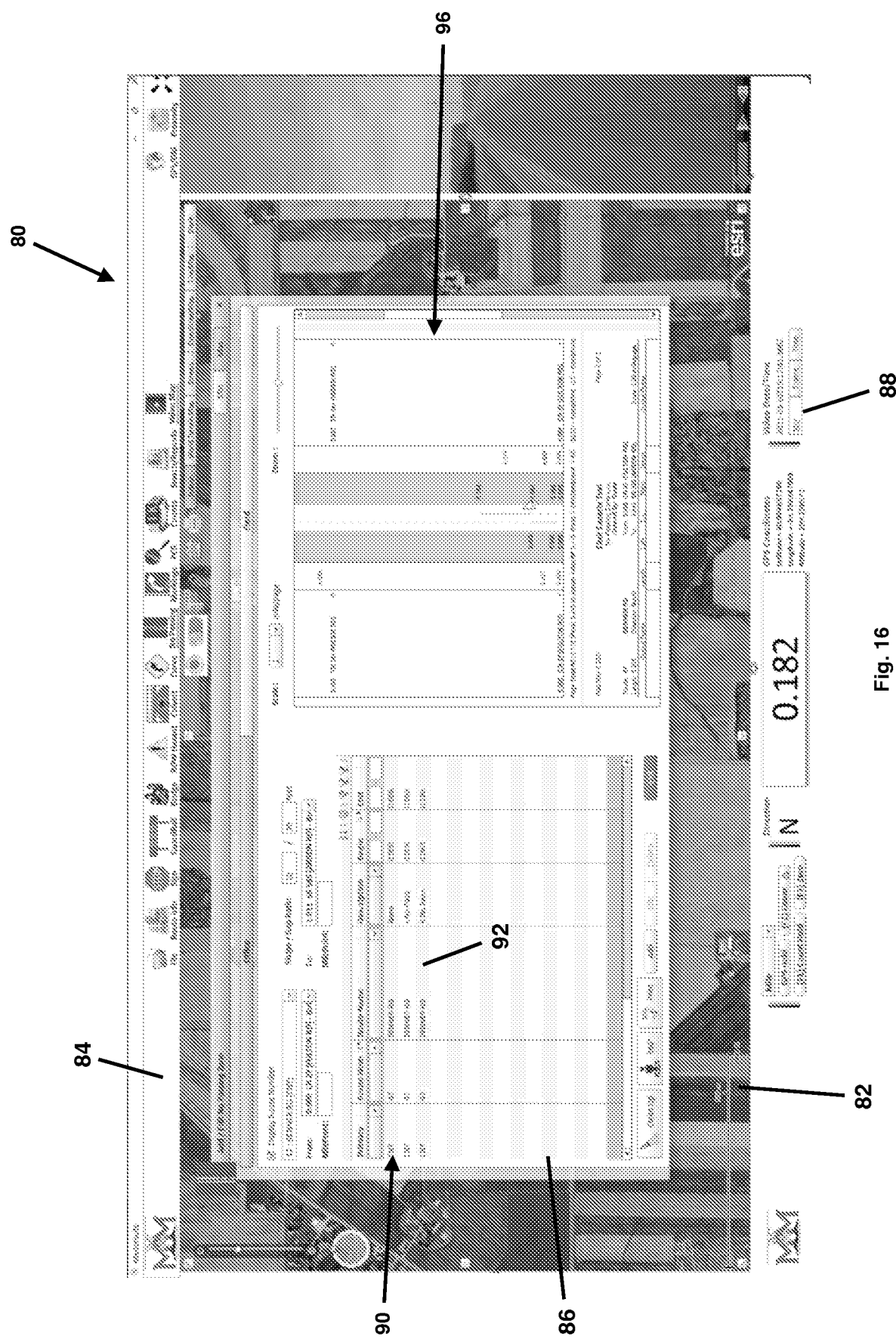
Figure 17:
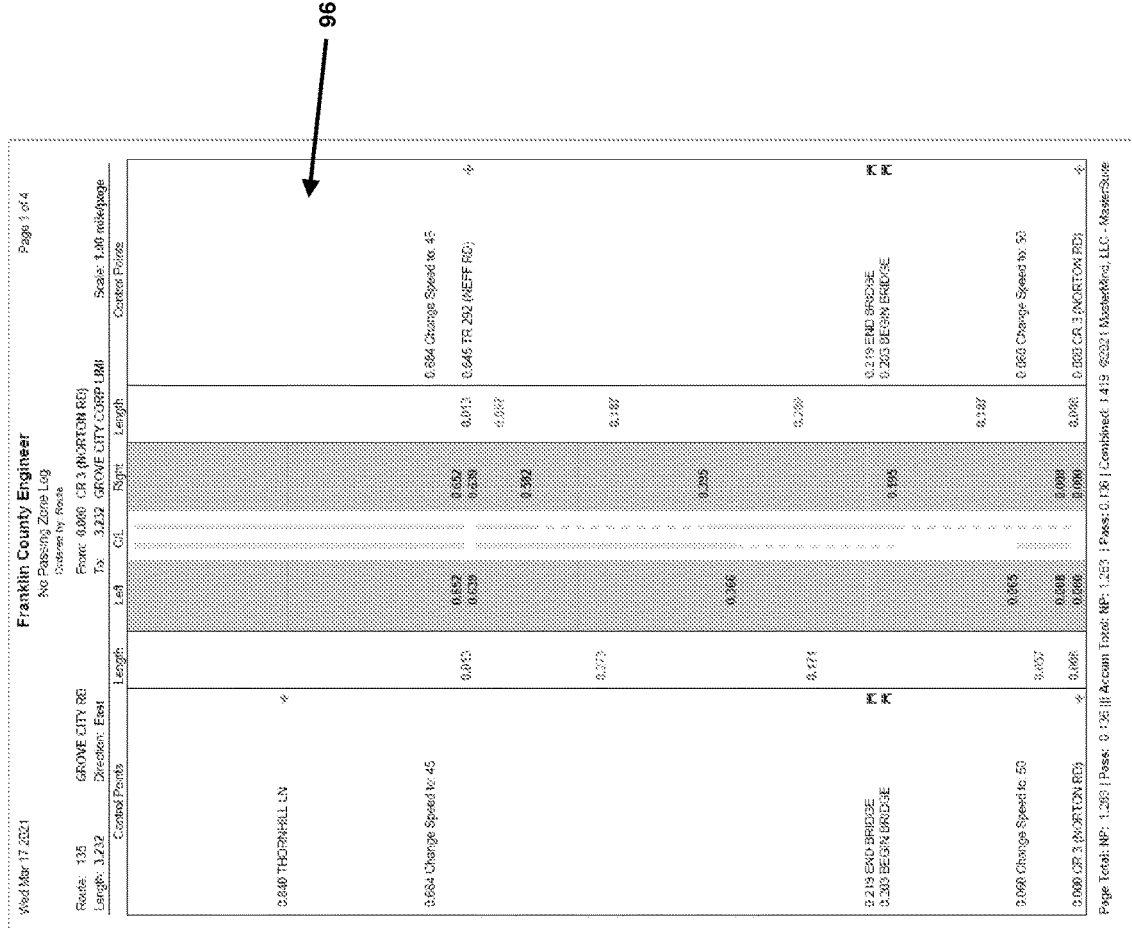
FIG. 17 is a report generated using the third computer application of FIGS. 11-16.

Upon selecting buttons for road features or user determinations, the third computer application may create entries 92 of the selections to thereby establish a record for the road 94. Referring now to FIGS. 16 and 17, the third computer application can generate a road report 96 based on the record 94 that was established. Here, the user can switch from the office tab to the field tab which shows the record 94 and a preview of a report 96. As shown, the report 96 may include an illustration of a road with various notes and measurements incorporated. Ideally, when an entry of a no pass zone is created (e.g., when the user selects the Left NPZone, the Right NPZone, and/or the Throw Zone buttons) the third computer application would automatically generate a solid yellow line to depict where vehicular passing should be prohibited, and what the line should look like overall. Likewise, the third computer application may automatically generate a dashed yellow like to depict where vehicular passing should be allowed. In this way, the third computer application may generate accurate, easy to understand reports 96. It is contemplated that such reports may be ideal for enabling local traffic authorities (i.e., local municipalities) to make better informed decisions and for facilitating T-marking and center line drawing by striping companies and road crews.

Mobile Application

Figure 18:
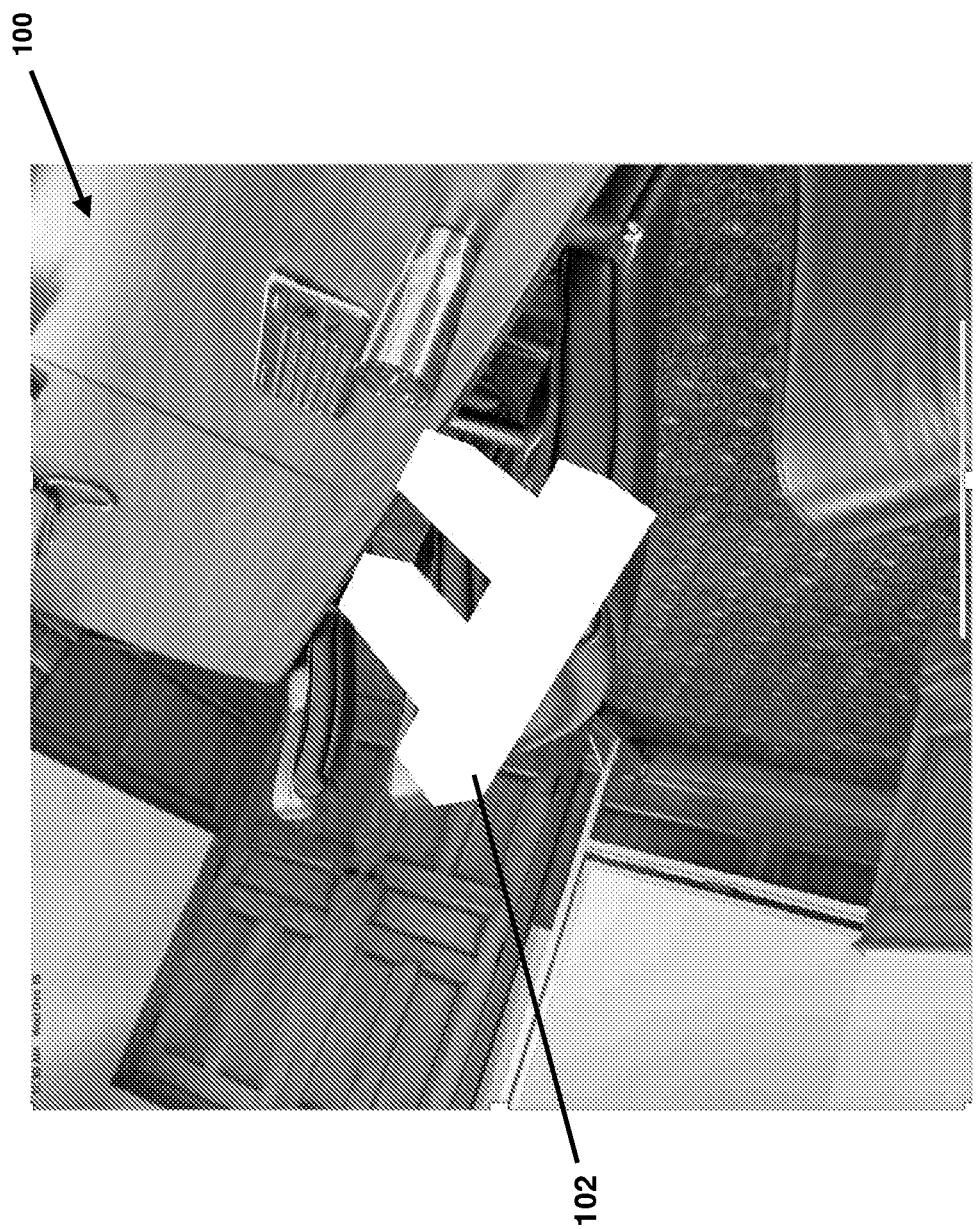
FIG. 18 is a screenshot from a mobile application for displaying T-marks in augmented reality.

Referring to FIG. 18, the present disclosure shows a screenshot 100 from a mobile application. The mobile application utilizes augmented reality technology to show a T-mark 102 for indicating where a road crew should start drawing passing lane lines on a road. That is to say, the mobile application may utilize the camera of a GNSS-enabled mobile device (e.g., smart phone, tablet, etc.) to capture images of a road and superimpose a 3D virtual T-mark 102 to show the precise location where the passing lane lines should begin. It is contemplated that the mobile application may utilize the POS data collected by the system 20 to determine where the precise location should be.

In addition to conducing passing zone studies, it is contemplated that the system 20 and the first, second, and third computer applications may also find utility for other purposes as well. For example, the system 20 and the first, second, and third computer applications may be used for pavement condition rating/indexing, pavement marking inventory (centerlines, edgelines, auxiliary markings, lane lines, etc.), horizontal curve "ball bank" studies, sign inventory and inspection, sign compliance studies, speed zone studies, guardrail location inventory and inspection, and roadside hazard inventory, among other things.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:
1. A method of conducting a passing zone study on a road, the method comprising the steps of:
providing a position and orientation system (POS) data set for the road, wherein:
the POS data set comprises a plurality of POS data points;
each POS data point represents a location on the road;
each POS data point comprises both a vertical position measurement and a distance measurement;
providing a lidar map representing the road that was georeferenced with the POS data set;
determining if there are any vertical line-of-sight obstructions for each POS data point of the POS data set by:
selecting a first POS data point of the POS data set, wherein the first POS data point represents a first location in the target area;
defining a linear distance range that starts at the first POS data point and extends in either the forward or backwards direction for a predetermined distance;
identifying POS data points of the POS data set that have a distance value within the linear distance range;
selecting a second POS data point of the data set, wherein the second POS data point has a distance value at or near the end of the linear distance range;
calculating the rate-of-change in vertical position and distance between the first and second selected POS data points;
determining, based on the calculated rate-of-change, a vertical limit for each in-range POS data point;
determining, for each in-range POS data point, whether any of those POS data points have a vertical position measurement that is greater than their vertical limits;
determining if there are any horizontal line-of-sight obstructions for each data point of the data set by:
navigating to a location in the lidar map;
defining a field-of-view that starts at that location and extends in either the forward or backwards direction for a predetermined distance;

determining if there are any lidar points within the field-of-view;

creating a record of each location along the road where there is no horizontal line-of-sight obstruction nor any vertical line-of-sight obstructions.

2. The method of claim 1, further comprising:

providing 360° footage of the road that was georeferenced using the POS data set;

navigating to a location in the 360° footage that matches the location used for the determining horizontal line-of-sight obstructions step; and visually confirming that there are no horizontal line-of-sight obstructions.

3. The method of claim 2, further comprising:

identifying roadway features in the 360° footage and creating a record thereof.

4. The method of claim 3, wherein:

the roadway features comprise at least one of: railroads, bridges, intersections, rumble strips, and curbs.

5. The method of claim 1, further comprising:

performing the determining vertical line-of-sight obstructions step for the opposite direction; and performing the determining horizontal line-of-sight obstructions step for the opposite direction.

6. The method of claim 1, wherein;

the predetermined distance for at least one of the vertical line-of-sight determination and the horizontal line-of-sight determination is 900 feet.

7. The method of claim 1, wherein:

the method further comprises adjusting the vertical position measurements of the first selected POS data point to a first adjusted vertical position;

the method further comprises adjusting the vertical position measurement of the second selected POS data point to a second adjusted vertical position; and the calculating the rate-of-change step comprises calculating the rate-of-change in vertical position and distance between the first and second adjusted vertical positions.

8. The method of claim 7, wherein;

at least one of the first and second adjusted vertical positions corresponds to a height of 3.5 feet above ground level in the real-world.

9. The method of claim 1 further comprising:

the step of determining how close the vertical position measurements of each in-range data point is to their vertical limits.

10. The method of claim 1, further comprising:

creating a report comprising an illustration representing the road with solid or dashed striping to indicate the location of no-passing zones and passing zones, respectively, wherein the type of striping is based on the presence or lack thereof of horizontal and vertical line-of-sight obstructions as indicated in the record.

* * * * *